(12) United States Patent
Strader

(10) Patent No.: US 8,640,588 B2
(45) Date of Patent: Feb. 4, 2014

(54) POWERED WEED TRIMMER CUTTING HEAD AND METHOD

(76) Inventor: Gordon Strader, Boise, ID (US)

( * ) Notice: Subject to any disclaimer, the term of this patent is extended or adjusted under 35 U.S.C. 154(b) by 314 days.

(21) Appl. No.: 13/018,623

(22) Filed: Feb. 1, 2011

(65) Prior Publication Data

US 2011/0232109 A1 Sep. 29, 2011

Related U.S. Application Data

(63) Continuation-in-part of application No. 12/033,699, filed on Feb. 19, 2008, now Pat. No. 7,878,097.

(60) Provisional application No. 60/901,764, filed on Feb. 16, 2007.

(51) Int. Cl.
B26D 7/26 (2006.01)
B26B 9/00 (2006.01)
B26B 7/00 (2006.01)
A01D 34/00 (2006.01)
A01D 34/52 (2006.01)
A01D 34/73 (2006.01)

(52) U.S. Cl.
USPC ............. 83/698.41; 30/276; 30/347; 56/12.7; 56/295

(58) Field of Classification Search
USPC ........................ 30/276, 296.1, 347, 299–300; 83/698.41, 699.21; 56/12.7
See application file for complete search history.

(56) References Cited

U.S. PATENT DOCUMENTS

| 3,805,639 | A | * | 4/1974 | Peter ............................... 74/616 |
| D280,903 | S | | 10/1985 | Barbula |
| D301,110 | S | | 5/1989 | Barbula |
| 5,617,636 | A | | 4/1997 | Taggett et al. |
| 5,622,035 | A | * | 4/1997 | Kondo et al. ................... 56/12.7 |
| 5,640,836 | A | | 6/1997 | Lingerfelt |
| 5,722,172 | A | * | 3/1998 | Walden ........................... 30/347 |
| 5,887,349 | A | | 3/1999 | Walden |
| 6,112,416 | A | * | 9/2000 | Bridges et al. ................. 30/276 |
| 6,119,350 | A | | 9/2000 | Sutliff et al. |
| 6,163,964 | A | * | 12/2000 | Calcinai ......................... 30/347 |
| 6,427,341 | B1 | | 8/2002 | Lee |
| 6,446,346 | B1 | | 9/2002 | Castleman |
| 6,681,865 | B2 | * | 1/2004 | Pace .............................. 172/111 |
| 6,817,102 | B2 | | 11/2004 | Harris et al. |
| 6,827,152 | B2 | * | 12/2004 | Iacona ............................ 172/42 |
| 6,912,789 | B2 | | 7/2005 | Price |
| 7,155,889 | B2 | | 1/2007 | Myers |
| 7,614,153 | B2 | * | 11/2009 | Guerra ........................... 30/276 |
| 2002/0029483 | A1 | * | 3/2002 | Price .............................. 30/276 |
| 2005/0050738 | A1 | * | 3/2005 | Harris et al. ................... 30/276 |
| 2008/0010836 | A1 | | 1/2008 | Iacona |

* cited by examiner

Primary Examiner — Ghassem Alie
Assistant Examiner — Bharat C Patel
(74) Attorney, Agent, or Firm — Pedersen and Company, PLLC; Ken J. Pedersen; Barbara S. Pedersen

(57) ABSTRACT

A generally cylindrical cutting head for a weed cutting machine has blades that are exposed and lifted off of the head when an upper portion is rotated, with respect to a lower portion and/or a cap, without tools and without disassembly of the structure. A lock ensures that the upper portion does not open until desired, by a rigid plate or aim extending, in the locked position, through portions of both the upper portion and the lower portion, or through portions of both the upper portion and a cap portion. The lock plate/arm may extend into the cutting head from the top, bottom, or side. When pushed inward, the lock plate or arm moves to no longer reside in both upper and lower portions, or both upper and cap portions, to free the upper portion to rotate relative to the lower portion and cap.

17 Claims, 16 Drawing Sheets

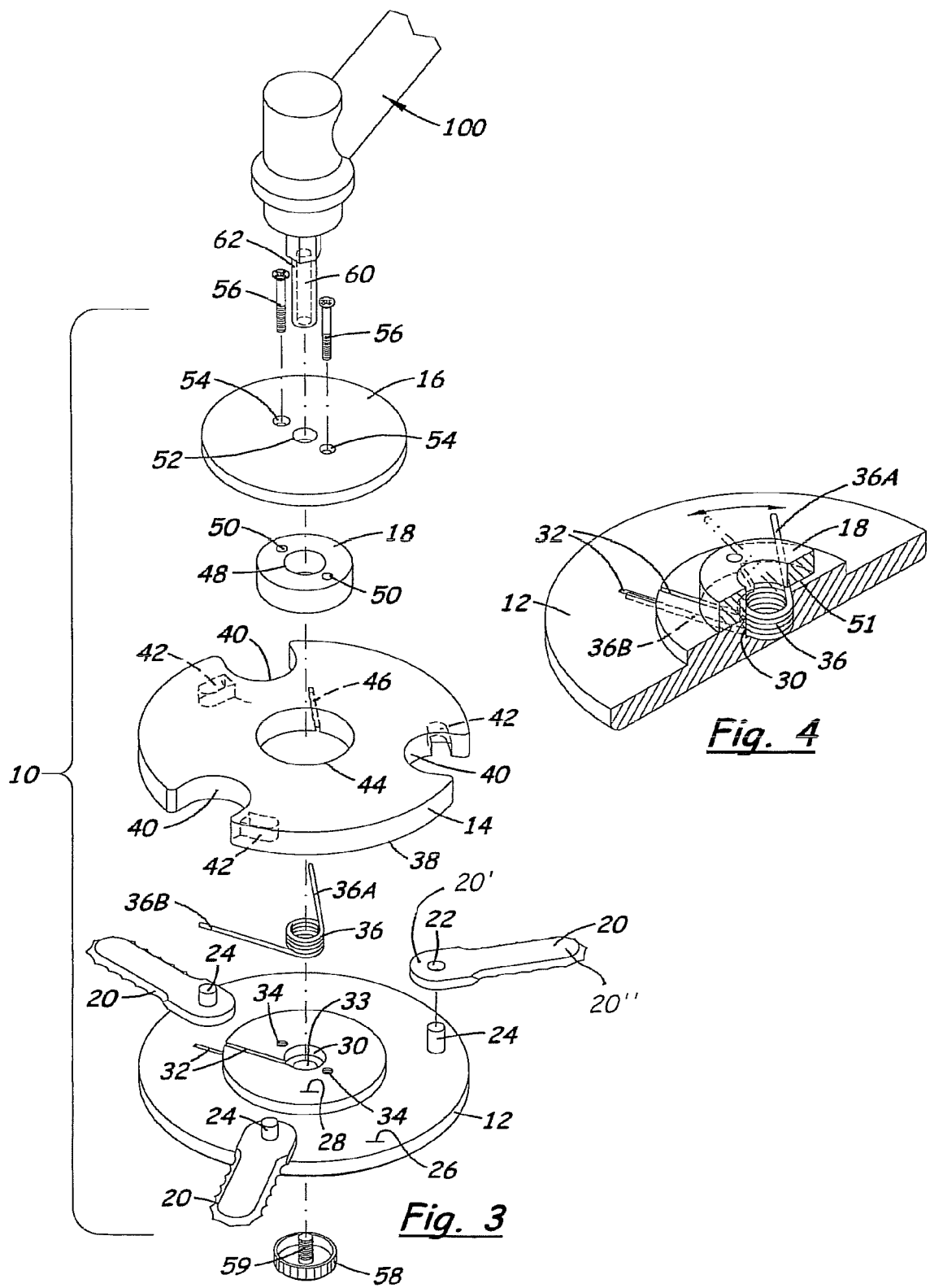

POWERED WEED TRIMMER CUTTING HEAD AND METHOD

This application is a continuation-in-part of application Ser. No. 12/033,699, filed Feb. 19, 2008, issuing on Feb. 1, 2011 as U.S. Pat. No. 7,878,097, which claims benefit of Provisional Application 60/901,764, filed Feb. 16, 2007, the entire disclosures of which are hereby incorporated by this reference.

BACKGROUND OF THE INVENTION

1. Field of the Invention

The present invention relates generally to gasoline or electrically powered devices used to trim or cut grass, weeds and brush, wherein a driven head assembly contains a plurality of cutting blades that rotate at high speed to cut the vegetation. The invented device relates more specifically to such a cutting device wherein the cutting head need not be disassembled to access the cutting blades and the blades are replaceable without the use of tools. This ease-of-replacement feature may be very beneficial at the cutting site where blades sometimes break, a quick fix is desired, and it is especially troublesome to drop pieces of the cutting device in the grass or weeds. Therefore, use of the invented device would be extremely practical by those persons who regularly use a powered weed cutting machine.

2. Related Art

Powered rotating vegetation cutting devices from the past have used a nylon string or a plurality of cutting blades rotating at a high rate of speed to cut plant matter. Periodically, the cutting blades in said conventional blade-based devices become unserviceable due to breakage or becoming dull and must be replaced. This operation normally requires the use of tools and at least partial disassembly of the cutting head to access the cutting blades. Frequently, a cutting blade may be broken during a cutting job, due to striking a hard object such as a stone, tree trunk, etc., and it is desirable to replace the broken blade on the spot so that the cutting job may be completed. Thus, it becomes necessary to either return the cutting machine to the garage or shop to accomplish the task, or to replace the cutting blade at the cutting site, wherein tools to do so must be carried on the person. Disassembly of the cutting head at the cutting site introduces the risk of the loss of cutting head parts within the vegetation at the cutting site and the attendant frustrating search through said vegetation to attempt to locate the missing parts.

Examples of conventional cutting heads are found in the patent literature. Barbula, in U.S. Pat. Nos. D280,903 and D301,110, illustrates cutting heads wherein screws are employed to retain the cutting blades upon the head, and wherein the cutting heads do not permit the removal and replacement of the cutting blades unless the screws are first removed. U.S. Pat. No. 6,119,350, Sutliff, et. al.; U.S. Pat. No. 6,681,865 B2, Pace; and U.S. Pat. No. 6,912,789, Price, III each address a cutting head for a rotary trimming device wherein the cutting head must be disassembled and/or special tools are required to remove and replace the cutting blades.

There is a need for an improved rotary vegetation cutting head that allows blade changing without tools and without disassembly of the head. There is a need for such a cutting head that results in no loose parts or fasteners during use or maintenance, except for replacement blades and removed broken blades. Such a cutting head would be convenient and beneficial to those who have trouble or dislike using small tools and handling small parts. The present invention may meet these and other needs.

SUMMARY OF THE INVENTION

The present invention relates generally to powered rotating weed or brush cutting devices of the type that use a set of cutting blades mounted and secured within a cutting head and where the centrifugal force of rotation tends to maintain the cutting blades in a fully extended attitude in a plane perpendicular to the centerline/axis of rotation. The invented cutting head device eliminates the need to disassemble the cutting head to replace cutting blades, thereby eliminating the need to carry tools upon the person, and requires only that replacement blades be available at the cutting site if so desired.

The invented device comprises a generally cylindrical structure that rotates as a unit when coupled to a powered trimmer, but wherein a portion of the cutting head may be rotated with respect to one or more other portions of the cutting head to allow access the cutting blades. Said rotation of one portion relative to another/others may include, for example, preferably rotating an upper portion relative to a stationary lower portion, rotating a lower portion relative to a stationary upper portion, rotating said upper portion relative to a stationary top portion that is provided above said upper portion, rotating both an upper and a lower portion in opposite directions at the same time, or rotating both an upper and top portion provided above said upper portion in opposite directions at the same time. The term "stationary" in this context means held without moving during the blade replacement process, but it should be understood that, after the blade replacement process, all parts of the preferred cutting head will rotate together or substantially together for the cutting process.

Preferably, the upper, or "cover," portion is held in the closed, operating position by one or more springs and/or by one or more locks. When it is desired to access the cutting blades, the lock(s), if any, is/are unlocked, and the cover portion is rotated using the hand (typically approximately 30 degrees) against the force of the spring to expose the pinned ends of the cutting blades, which then may be replaced as necessary. Upon completion of the replacement operation, all that is typically required to return the preferred device to operating condition is to release the hand from the cover to allow the cover to rotate back to the closed position, and, if present, the lock(s) is/are re-locked. The preferred cutting head comprises three main portions, including an upper portion (or "cover) above a lower portion ("base"), plus a top portion ("cap") that is provided above the upper portion. The preferred base and cap are fixed together (immovable relative to each other during normal use), with the cover being rotatable relative to both base and cap when it is unlatched from said base and/or cap.

The preferred cutting device is constructed of materials that are lightweight, suitably strong, resilient, shock resistant and waterproof such as plastic, aluminum or other materials. The preferred device has three, evenly-spaced cutting blades, but embodiments with other numbers of blades may be effective. The preferred device is capable of being retrofit to existing rotary cutting machines, replacing the cutting head originally supplied with said machines; in some cases, an adapter may be used to properly fit the preferred cutting head to the cutting machine.

BRIEF DESCRIPTION OF THE DRAWINGS

FIG. 3 is an exploded perspective view of the embodiment of FIGS. 1 and 2.

FIG. 4 is a partial perspective view of the embodiment of FIGS. 1-3, showing the action of one embodiment of a spring during the steps of revealing and recovering the ends of the cutting blades, which steps allow removal of a broken or dull blade and replacement with a new blade. The blades are not shown in FIG. 4.

FIG. 13 is a cross-sectional view of the embodiment of FIG. 12, viewed along the line 13-13 in FIG. 12, wherein FIG. 13 illustrates to the lock system of this embodiment in a locked condition. Note from FIGS. 12 and 13 that the lock system is offset from the central axis of the cutting head and does not interfere with attachment of the cutting head to the cutting machine by means of structure extending through the central bore/aperture of the cutting head.

In FIG. 16, the cover is in the closed and locked position.

DETAILED DESCRIPTION OF THE PREFERRED EMBODIMENTS

Referring to the Figures, there are shown several, but not the only, embodiments of the invented cutting head device wherein upper and lower portions may be rotated with respect to one another for convenient access to the cutting blades, said access preferably requiring neither the use of tools nor disassembly of the cutting head. Note that the terms "upper" and "lower" indicate relative positions of preferred portions of the device, but these terms do not necessarily preclude additional structure from being above and below or between, respectively, these upper and lower portions.

Invented methods of installing, using the cutting heads, and replacing the cutting blades, as disclosed herein, are also considered embodiments on the invention.

Figure 1:
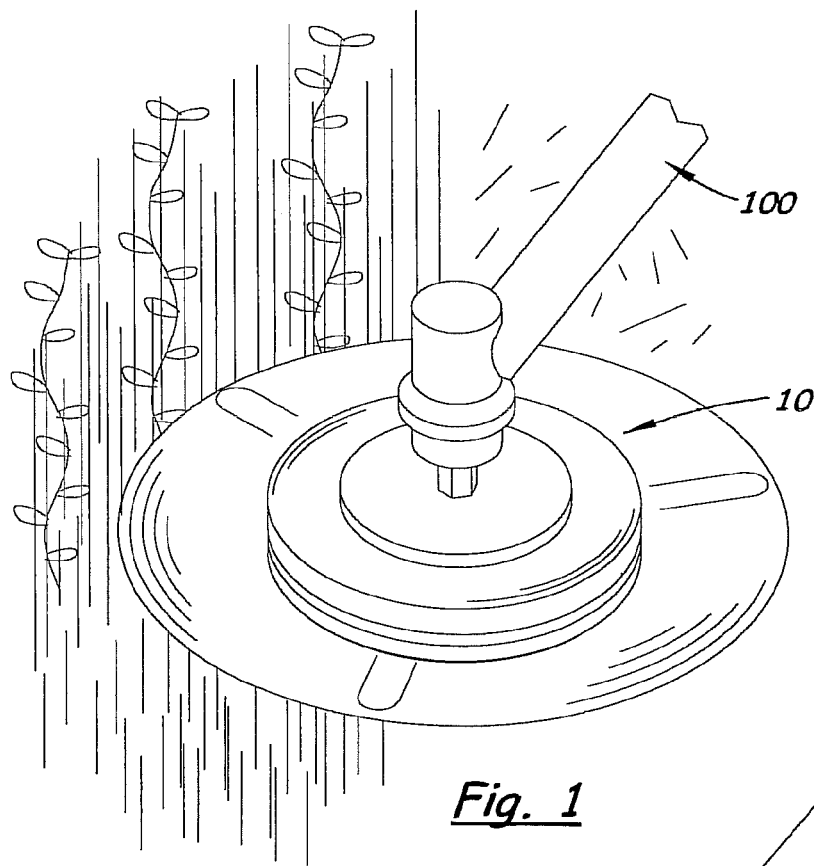
FIG. 1 is a perspective view according to one embodiment of the present invention, showing the device in use, wherein, due to the high speed of rotation of the cutting head, the details of the head and the blade are "blurred" in this drawing. The embodiment of FIG. 1 is understood to connect to a power unit with a handle for the user.

Referring now to FIG. 1, one embodiment of a vegetation cutting head 10 according to the invention is coupled to the drive end of a conventional rotary cutting machine 100 and is shown being driven in conventional manner by the machine to cut grass and weeds. Only a small portion of the shaft of the machine is shown in FIG. 1, but the nature and large variety of rotary cutting machines will be understood by one of skill in the art, and many are currently commercially available. In general, the cutting head is attached to the lower end of the cutting machine, with the rotating shaft of the machine received coaxially in the generally cylindrical cutting head and tightened to and/or otherwise engaging the cutting head so that the rotating shaft rotates the cutting head.

Figure 2:
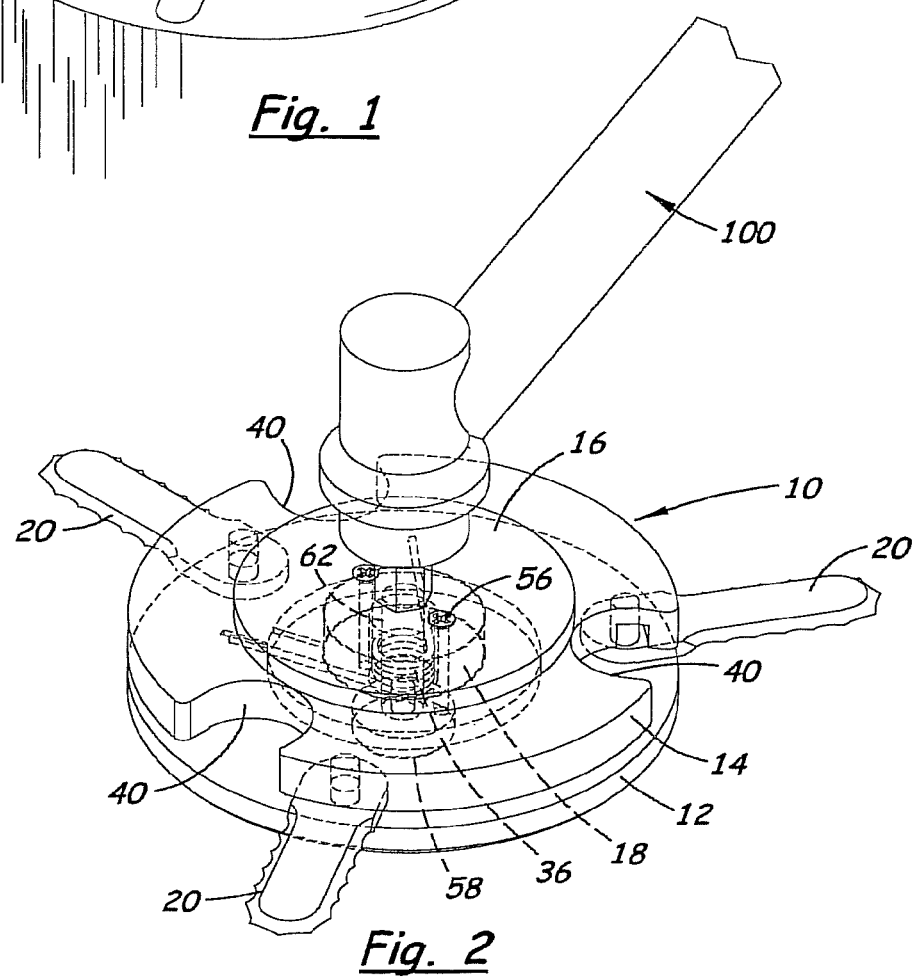
FIG. 2 is a perspective view according to the embodiment of FIG. 1, showing the device in the operating position but not yet rotating.

Referring now to FIGS. 2-4, it will be seen that cutting head 10 is coupled to cutting machine 100, and is generally comprised of base portion 12 and cover 14. Cutting blades 20 are slidably installed on, or removed from, pins 24 extending upwards from the base portion 12, which pins 24 may be uncovered by means of access notches 40 in cover 14. Cap 16 and spindle 18 are secured to the base by fasteners 56, which may be seen to extend from/through cap 16, through spindle 18, through center plate 28, and into base 12. Cap 16 and fasteners 56 are used to secure spindle 18 and base 12 to one another by aligning holes 54 in cap 16, holes 50 in spindle 18, and threaded holes 34 through plate 28 and into base 12. Alternatively, if plate 28 if an integral, raised portion of base 12, then fasteners 56 may extend into and threadably engage holes 34 in plate 28 only, rather than extending farther down into base 12. It is important to note that fasteners 56 need not be removed, and the head 10 need not be disassembled, in order to remove the blades, as will be discussed further below. Also it may be noted that spindle 18 may be an integral portion of the base 12, if adaptation(s) is/are provided to allow insertion and proper placement of a spring/bias member.

The center plate 28 may be described as rising up above and inward (that is, closer to the central axis of the head and not extending as far out radially as the base), relative to the upper surface 26 of the base. Also, the spindle 18 may be described as rising up above and inward (closer to the central axis of the head and not extending as far out radially as the plate 28) relative to the plate 28.

Cover 14 is received between the cap 16 and the central plate 28, with cover 14 received around spindle 18 by means of central bore 44. Cover 14 may rotate on spindle 18 in its plane, which is parallel to the planes of cap 16, central plate 28, and base 12, to an extent controlled by spring 36, as discussed below. Cover 14 preferably rests and rotates on plate 28, and is spaced from the upper surface 26 of the base by a distance equal to the thickness (height) of plate 28.

Cutting head 10 is secured to cutting machine 100 utilizing shaft 62 of cutting machine 100, which extends down through the cap 16, spindle 18 (thus, extending through the cover on said spindle), and the base 12. Threaded knob 58 connects to shaft 62 by engaging threaded bore 60 of the shaft 62. It will be noted that with cover 14 in the closed position, cutting blades 20 are safely and positively secured and retained within cutting head 10, by virtue of being captured between the base 12 and the cover 14 in a plane parallel to both of said base and cover.

Referring now to FIG. 3, it will be observed that base 12 contains pins 24 anchored within and protruding upwardly to be received within holes 22 of cutting blades 20. Cutting blades 20, when installed upon pins 24, are free to rotate through an arc around the centerline of pins 24, thus allowing cutting blades 20 to rotate independently of the centrifugal force imparted by the rotation of the cutting machine 100. Thus, cutting blades 20, which normally will rotate in the positions/path shown in FIG. 1, may rotate out of the centrifugal path of rotation should a hard or immoveable object such as a rock be struck during a cutting operation.

Preferably, there are no screws, bolts, clamps, or fasteners used to secure the blades to the cutting head. The only fastening means for the blades is the blades being slidably and removably received on the pins, and the base 12 and cover 14 capturing the blades there-between. Further, preferably, there are not screws, bolts, clamps, or fasteners used to secure the cover to either the base 12 or the cap 16.

Shown to best advantage in FIGS. 3 and 4, center plate 28 (or "center pad 28") may be a plate attached by means of fasteners 56, for example, to the center portion of based 12, or, alternatively, plate 28 may be a raised, integral center portion of base 12. Center plate 28 is the surface upon which lower surface 38 of cover 14 rests, thus, creating a space between the outer upper surface 26 of base 12 and the lower surface 38 cover 14 in which the pinned ends of cutting blades 20 are contained. Within center pad 28 is bore 30 (which may also be considered an upper portion of base bore 33, especially if plate 28 is an integral portion of base 12), wherein the central, coiled portion of torsion spring 36 resides. Cut through plate 28 and into the upper surface 26 of the base is slot 32, which receives lower leg 36B of spring 36, thereby fixing the position of spring 36 within cutting head 10. When cover 14 is placed upon base 12, upper leg 36A of spring 36 resides within slot 46 cut within the lower surface 38 of cover 14. See, especially, FIGS. 3 and 10.

The lower leg (leg 36B) and central, coiled portion of spring 36, therefore, are captured in the base 12 and plate 28, while the upper portion (leg 36A) is captured in the cover 14. Spring 36 biases the cover to stay in a closed position relative to the base. At least the top coil of the central, coiled portion of the spring 36, and upper leg 36A, both extend upwards above the top surface of plate 28, said at least the top coil and leg 36A extend part way into spindle 18, as is shown to best advantage in FIG. 9. Leg 36A extends from the top coil, received in bore 48 of the spindle, to slot 46 in the cover, and, in doing so, extends through recess 51 of the bottom surface of spindle 18. Recess 51, shown to best advantage in FIG. 11, allows upper leg 36A to swing/pivot in said recess 51 as cover 14 is rotated with respect to base 12.

Figure 5:
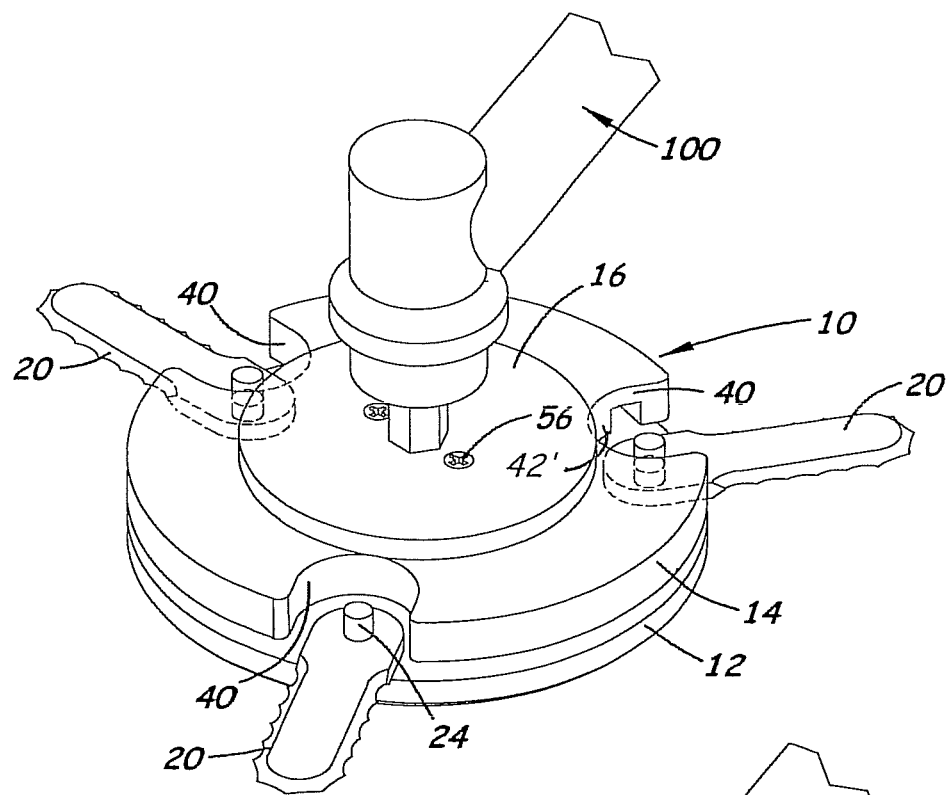
FIG. 5 is a perspective view of the embodiment of FIGS. 1-4, showing the device rotated open for blade replacement.
Figure 10:
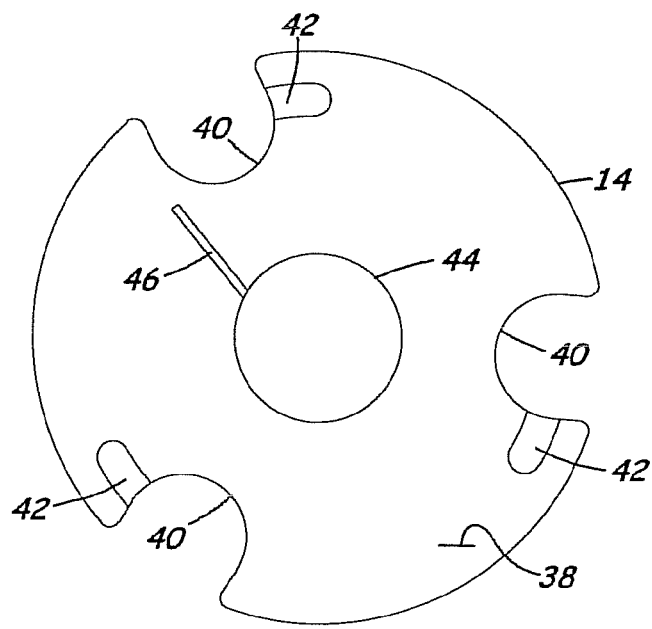
FIG. 10 is a bottom plan view showing the bottom surface and details of the cover of the embodiment of FIGS. 1-9.

Referring to FIGS. 3, 5, and 10, channels 42 in cover 14 fit loosely over the upper ends of pins 24, so that there is some space between the pins and the cover. The channels 42, however, are shaped and sized to limit said space, to prevent the blades 20 from falling or flying out of the cutting head when the cover is closed. Also, accommodation may be made to assist the channels 42 in sliding over the blades 20, when the cover closes, to help prevent jamming of the cover against the inner end 20' of the blade. This may be important for blades that, when installed over the pin, tend to tilt so that their inner ends 20' raise up off of the upper surface 26. For example, rounding or otherwise removing material from the channel corner 42' (see FIG. 5) may allow the cover to push the inner end 20' of the blade downward against the upper surface 26 of the base to be out of the way while the cover closes completely.

One of skill in the art will realize, upon reviewing this disclosure and the drawings, that there are various ways and structure of installing one or more springs or other biasing means in the cutting head. Preferably, one or more springs may be used and preferably are captured in the head at least to an extent that said one or more springs will not fall easily out of the cutting head during assembling the cutting head. As disassembly and re-assembly of the cutting head (after initial manufacture) is not required in the preferred embodiments, once the spring(s) are captured during manufacture, the spring(s) will typically not be likely to fall out or be lost. In the embodiment of FIGS. 1-11, a single spring of sufficient strength is used and positioned so that normal use of the cutting head will not tend to open the cover. While one orientation for the spring, cover, and cover slot system relative to the blades and the base is shown in FIGS. 1-11, said orientation may be changed for embodiments wherein the cutting head rotates in the reverse direction. Said orientation and the spring strength are adapted so that the spring bias is not overcome by the rotation of the cutting head, so that the cover does not open during cutting operation. Preferably, the spring bias acts in a direction opposite to the direction of rotation of the cutting head. Optionally, a cover lock may be included in the embodiment of FIGS. 1-11, to ensure that the cover does not open during cutting operation. Alternative embodiments are portrayed in FIGS. 12-35 that include several, but not the only, embodiments of lock systems, and/or different, but not the only, spring arrangements.

Cutting head 10 is secured to cutting machine 100 by inserting shaft 62 within and through aligned bore 52 in cap 16, bore 48 in spindle 18, and bores 30/33 in plate 28 and base 12. By extending through the plate 28 and its bore 30, the shaft 62 also extends through the center space of the coil of spring 36, which is received in bore 30. Treaded shaft 59 of knob 58 is threaded and tightened within threaded bore 60 of shaft 62 to complete the assembly.

FIG. 4 illustrates the position of spring 36 and spindle 18 upon base 12, wherein the spring may be seen to be captured in the slot 32 of the base, and slot 32 and bore 30 of the plate 28. The leg portion called-out as 36A in FIG. 4 extends from the recess 51 of spindle 18 to extend into slot 46 of the cover (not shown in FIG. 4).

FIG. 5 illustrates cover 14 in the open position wherein the cover 14 has been rotated to align notches 40 with, and to expose, the pinned ends of cutting blades 20. It may be noted that the diameter of cap 16 is significantly smaller than the diameters of cover 14 and base 12, and cap 16 does not extend across notches 40 or otherwise interfere with removal of the blades. It may be noted that the preferred single cover (rotation of the single cover, relative to the base, to the open position) uncovers all of the blades at the same time for removal; thus, it is not necessary to manipulate multiple covers or multiple screws, bolts, clips, clamps, or fasteners in order to reveal and remove a plurality or all of the blades. When the preferred cover is opened and the cutting head is maintained with the head in a generally horizontal orientation, the blades will tend to remain on their pegs/pins until the user purposely removes one or more blades. As the blades 20 are retained in the cutting head only by means of being received on said pins 24, and being retained on said pins 24 by the cover (when the cover is closed), the blades might tend to fall off the pins and out of the cutting head if the cover were opened and the cutting head turned up-side down. Therefore, during normal blade replacement, the cover will be opened while the cutting head is held generally horizontally, so that the user (rather than gravity) may decide what blade(s) to remove. During weed-cutting operation, the cover will be closed and the device may be used in horizontal or tilted orientation.

Figure 6:
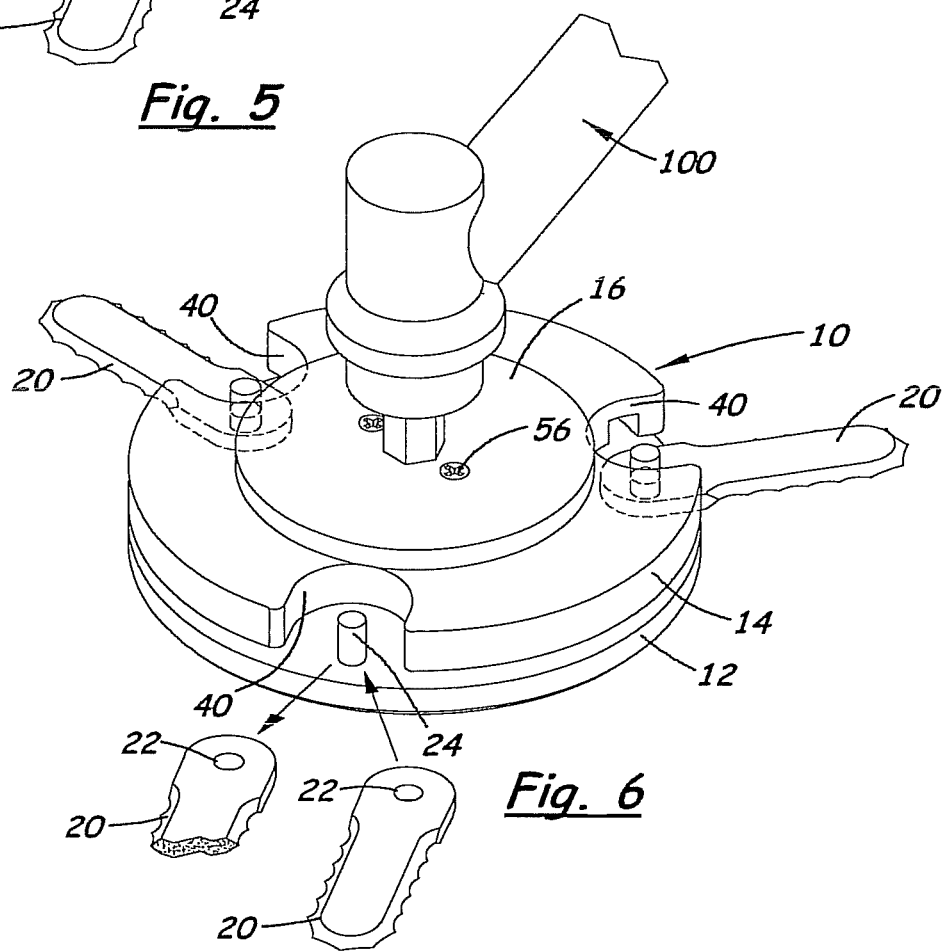
FIG. 6 is a perspective view of the embodiment of FIGS. 1-5, showing a broken blade being removed and replaced with a new blade.

FIG. 6 illustrates a broken cutting blade 20 having been removed from pin 24 and a new cutting blade 20 about to be installed.

Figure 7:
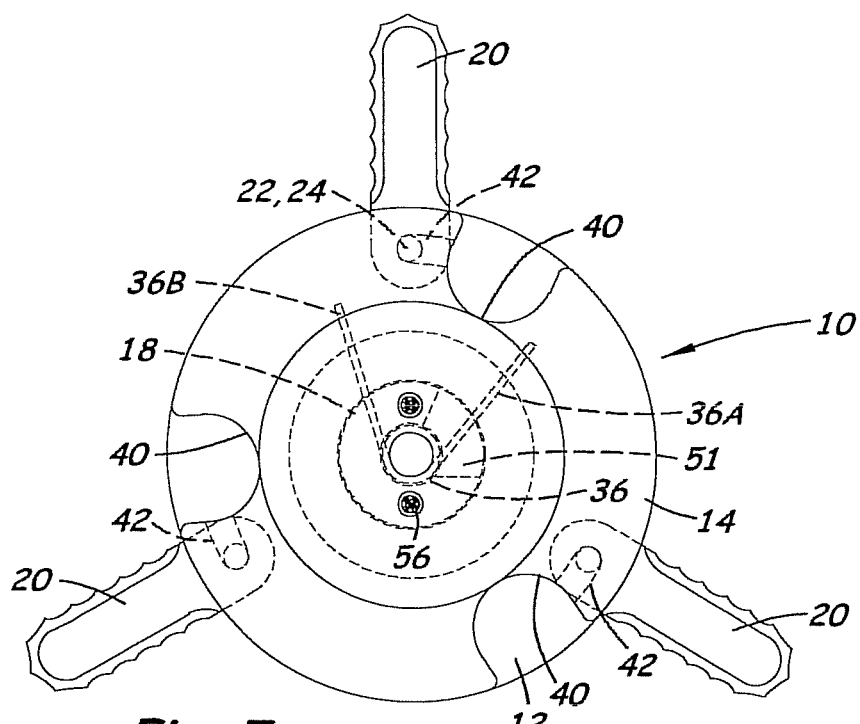
FIG. 7 is a top plan view according to the embodiment of FIG. 1-6, showing the cover closed.

FIG. 7 illustrates cutting head 10 with cover 14 in the closed position, with notches 40 rotated away from cutting blades 20 and pins 24 residing within channels 42.

Figure 8:
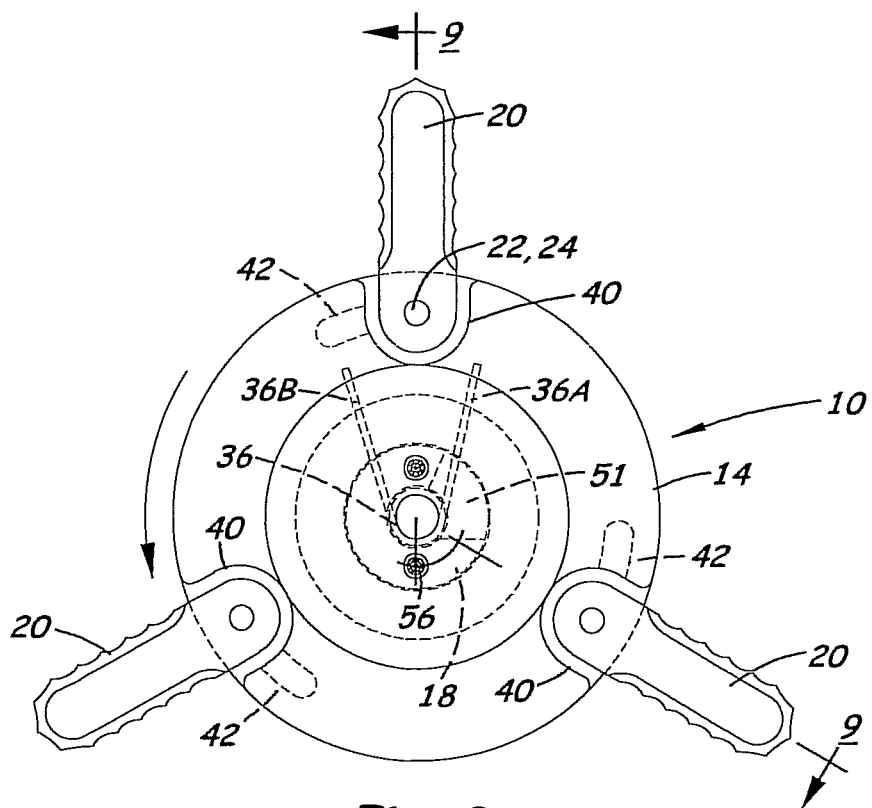
FIG. 8 is a top plan view according to the embodiment of FIG. 1-7, showing the cover open.

FIG. 8 illustrates cutting head 10 with cover 14 rotated to align notches 40 with the pinned ends of cutting blades 20. It will be noted that lower leg 36B of spring 36 remains stationary, while upper leg 36A of spring 36 rotates counter-clockwise within recess 51 of spindle 18.

Figure 9:
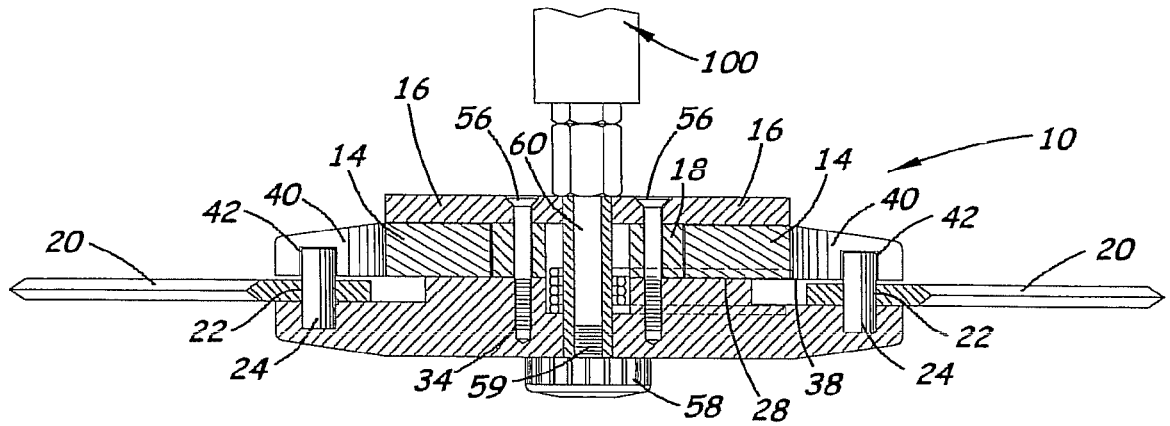
FIG. 9 is a cross-sectional elevation view of the embodiment of FIGS. 1-8.

FIG. 9, taken along line 9-9 of FIG. 8, illustrates the internal fitting of the various parts described in the preceding Figures.

FIG. 10 illustrates the lower surface 38 of cover 14.

Figure 11:
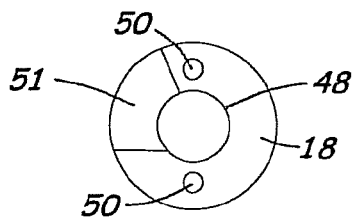
FIG. 11 is a bottom plan view showing the bottom surface and details of the spacer/spindle of the embodiment of FIGS. 1-10.

FIG. 11 illustrates the lower surface of spindle 18, wherein recess 51 is located to receive upper leg 36A of spring 36.

FIGS. 12-15 illustrate an alternative embodiment comprising a lock that is accessible from the top of the cutting head. As shown to best advantage in FIG. 13, cutting head 200 comprises base 212, which includes integral central plate 228 and integral spindle 218 upending from generally flat platform 225. Thus, the general structure and function of parts (base 12, plate 28, and spindle 18) that are separate in cutting head 10 are combined in cutting head 200 in a single, integral base 212. Spring 236 is embedded in base 212, with its lower arm 236B resting in a slot in the plate 228 and its coil resting in bore 233, and it upper arm 236B extending out, through recess 251 in the top surface 252 of the spindle 218, to reach the cover 214. Cover 214 rests on top of plate 228, receives spindle 218 in its bore (defined by surface 244), and is rotatable around spindle 218 for covering and uncovering the pinned ends of the blades (wherein the blades are not shown in FIGS. 12-15). Cap 216 rests on top of, and may be screwed or otherwise fixed to, the top surface 252 of spindle 218, with clearances provided so that cover 214 may rotate between plate 228 (upon which cover 214 rests) and cap 216 (which covers and contains cover 214). Pins 224 are provided in the platform 225, and may be secured therein by screws 227 extending inward from the outer perimeter of the platform 255 to engage the pins 224, or by other methods of anchoring the pins in the base.

The entire cutting head may be attached to the shaft of a cutting machine, as described earlier in this disclosure. For example, the cutting machine shaft extending through centrally-located aligned bores through the cutting head and connecting to a threaded knob (similar to knob 58) or by another fastener or other means.

Cutting head 200 comprises a lock system 270 that ensures that the cover will not rotate, that is, will not open, during use on the cutting machine. Lock system 270 may be said to include a lock member that may comprises lock plate 272 that is resides, and slides vertically up and down, in a vertical slot 274 that is provided in the base 212, wherein typically a portion of the slot 274 is in all of the platform 225, plate 228, and spindle 218 portions and also a portion of the slot 274 is also in the cover 216. Handle 276 is provided at the top of the lock plate 272 and may be a portion of the lock plate 272 that is bent over to provide a horizontal finger-contact pad for being pushed by the user. The handle 276 is accessible at a top opening of the slot 274 at a top surface of the head 200, which may be the top surface of cap 216.

Figure 12:
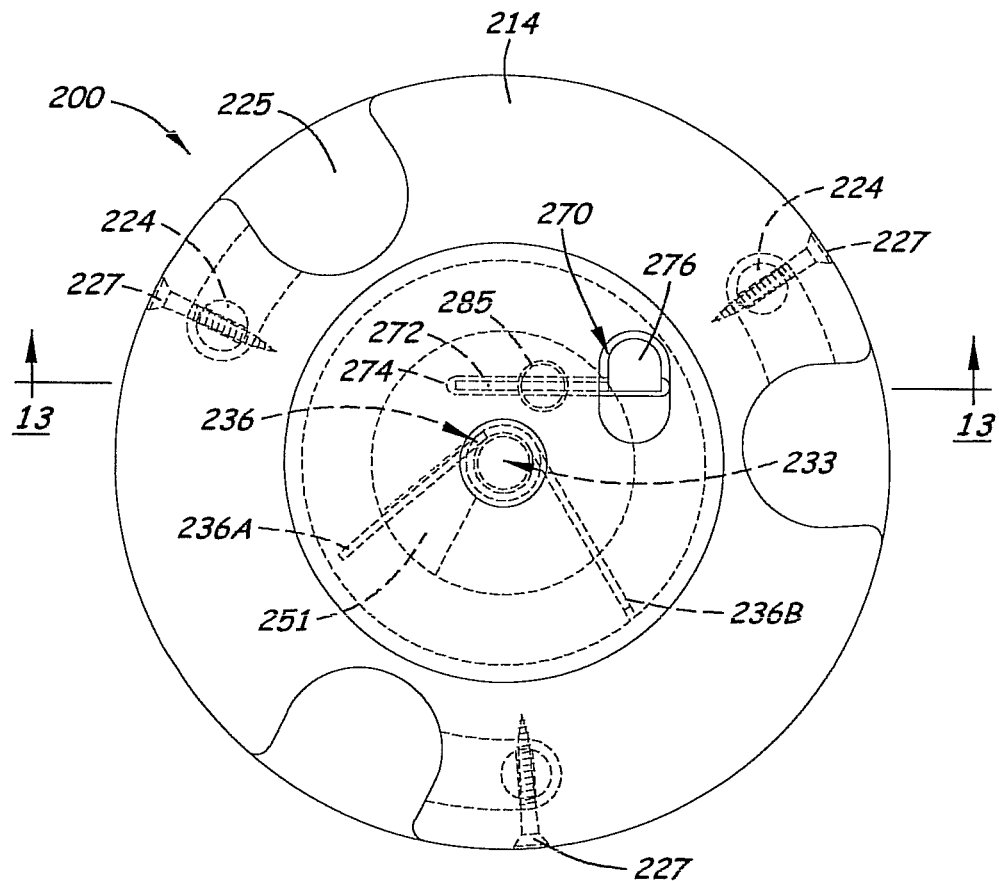
FIG. 12 is a top view of an alternative embodiment of the invented rotary cutting head, in the closed position, wherein the cutting head includes a safety lock for further ensuring that the cover will not open during use. For simplicity, the blades are not shown in FIG. 12, but it will be understood that they may reside and be retained on the pins by the closed cover in FIG. 12.
Figure 13:
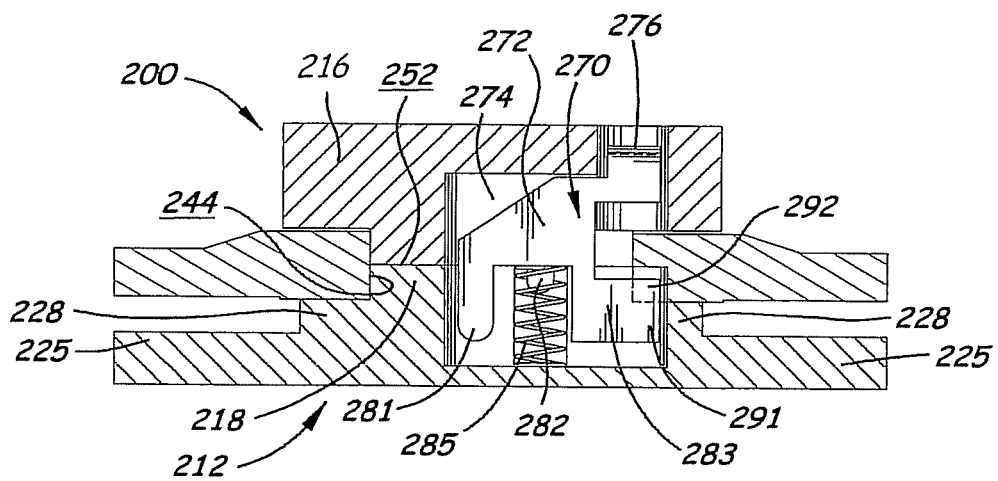

Lock plate 272 comprises three downwardly-protruding legs 281, 282, 283. Leg 282 protrudes into the hollow space of a spring 285 that biases the lock plate 272 into a raised position (as in FIG. 13) wherein leg 283 resides in portions of the slot 274 in both the base 212 and the cover 214. Specifically, the lower corner 291 of leg 283 resides in the slot portion in base 212, while upper corner 292 of leg 283 resides in the slot portion of the cover 214. With the lock plate 272 in this position, as shown in FIG. 13, the cover 214 is blocked by leg 283 from rotating relative to the base 212, so that cover 214 remains closed over the pins 224, as shown in FIG. 12.

Figure 14:
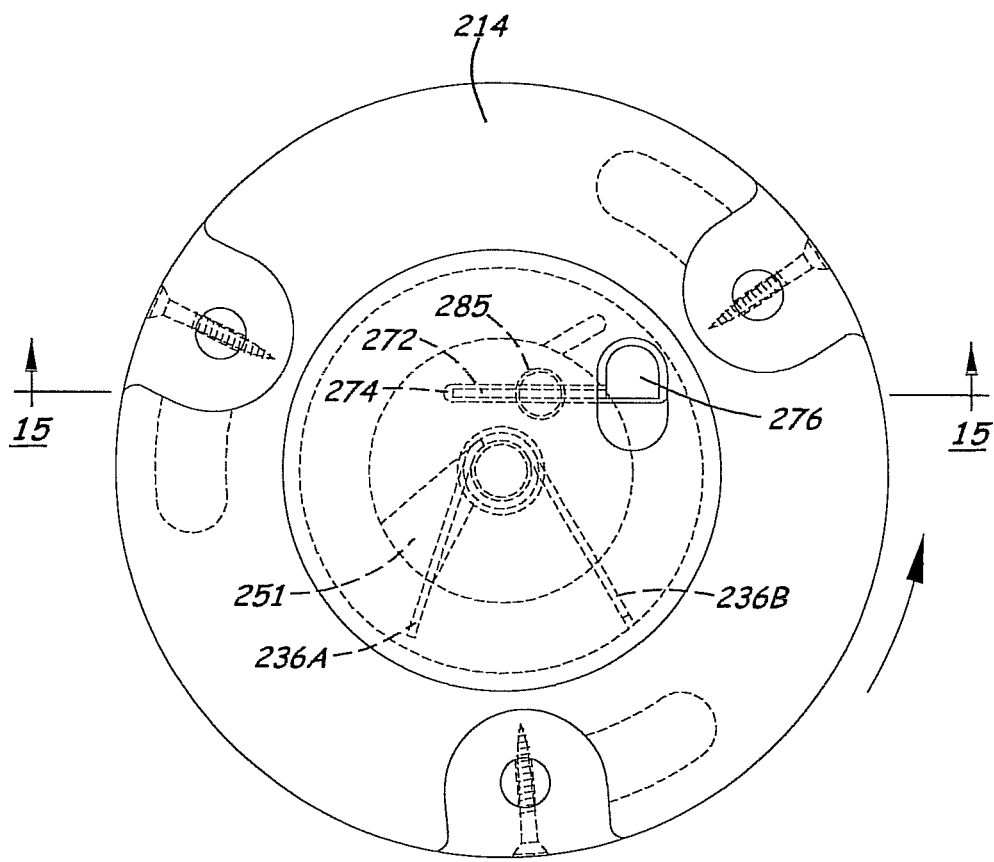
FIG. 14 is a top view of the embodiment of FIGS. 12 and 13, wherein the lock has been depressed and the cover has been rotated approximately 30 degrees to reveal the pins, whereby the blades (not shown in this view) could be installed and/or removed from the pins. Note in this view that the spring arm has been forced to rotate with the cover about 30 degrees.
Figure 15:
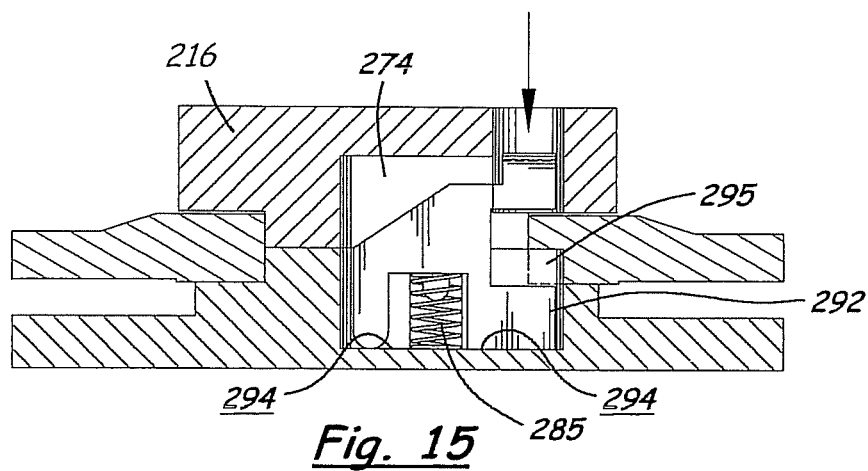
FIG. 15 is a cross-sectional view of the embodiment of FIGS. 12-14, viewed along the line 15-15 in FIG. 14, wherein the lock may be viewed in the unlocked position.

When the user desires to uncover the pins and blades, the lock 270 may be unlocked by depressing handle 276, as shown in FIG. 15. Upon doing so, lock plate 272 slides downward (axially) in the vertical slot 274, against the bias of spring 285 (compressing spring 285), to the point at which leg 281 and leg 283 abut against the bottom wall 294 of the slot. The lock plate 272 is sized and shaped so that, at this point, the upper corner 292 is completely removed from the vertical slot portion 295 of the cover 214, that is, is lower than the cover, so that the cover 214 may now rotate relative to the base 212. It may be noted that most of the structure of lock plate 272 resides at all times in the base 212 and cap 216, with only leg 283 extending generally radially outward to pass through a portion of the cover 214 (specifically through slot portion 295). The lock plate 272 slides up and down to a raised position wherein leg 283 extends across the boundary between base 212 and cover 214 to block relative movement, and to a lowered position wherein leg 283 is lowered out of the way of the cover 214 to allow relative movement. As shown in FIG. 14, when the lock is lowered as it is in FIG. 15, cover 214 may be rotated to uncover the ends of blades 20 (not shown) on pins 224.

The lock handle 276 optionally may be released as soon as the cover is manually rotated to the open position, as spring 285 will urge the lock plate 272 to the lock position, but the lock plate 272 will not be able to re-enter the slot portion 295 in the cover until the cover again returns to the closed position and the slot portion 295 is again aligned with the portion of slot 274 in the base. Alternatively, the lock handle 276 may be held in the depressed condition by a finger of the same hand that is holding the cutting head (while the other hand rotates the cover), for example, until the one hand releases the cover and the other hand releases the handle 276 of the lock, and/or until both hands are removed.

Referring to FIGS. 16-22, there is shown yet another alternative cutting head 300, which uses an annular spring system for biasing the cover 314 to a closed position, and that uses a horizontal lock system. Base 312 comprises platform 325 having a large central bore 333. Cap 316 rests on base 312 and is fixed to base 312, for example, by screws 317 that anchor an inner ring 313 of base 312 to a downwardly-protruding ring 319 of cap 316. Rotatably received between base 312 and cap 316 is cover 314. Accommodation may be made to one or both of the base 312 and cover 314 to help prevent blade outer ends 20" (see FIG. 3) from becoming wedged between base 312 and cover 314 if said outer ends 20" swing into the space between the base and cover. For example, a lip 326 (FIG. 17) and/or other curvature in surfaces adjacent to the lip 326 may be provided to deflect or block said outer ends 20". Both cover 314 and cap 316 also have large central bores, which aligns with large bore 333 to provide a large central cavity 334 through the head 300 that may be used to connect the head 300 to many different cutting machines. For some machines, an adapter may be used to fit the head 300 to the machine.

Figure 16:
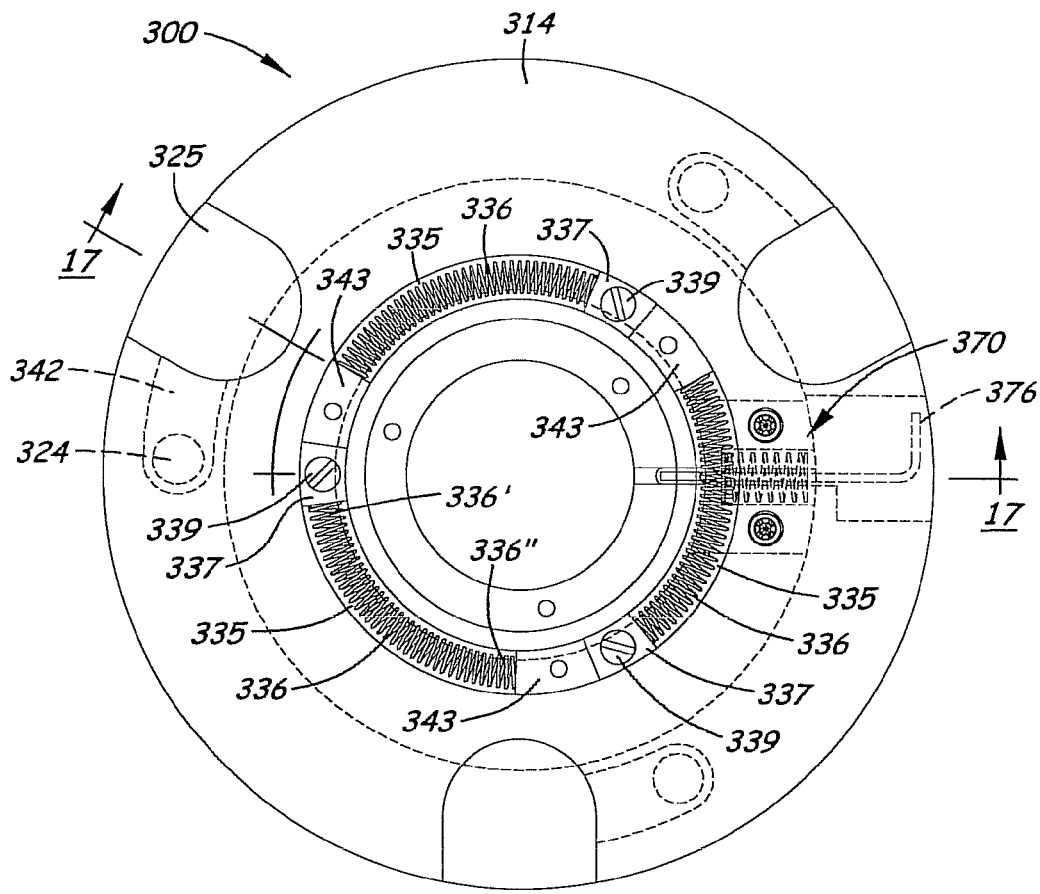
FIG. 16 is a top view of yet another alternative embodiment of the invented cutting head 300, wherein the cap is removed to reveal the annular spring system that biases the cover to a closed position.
Figure 17:
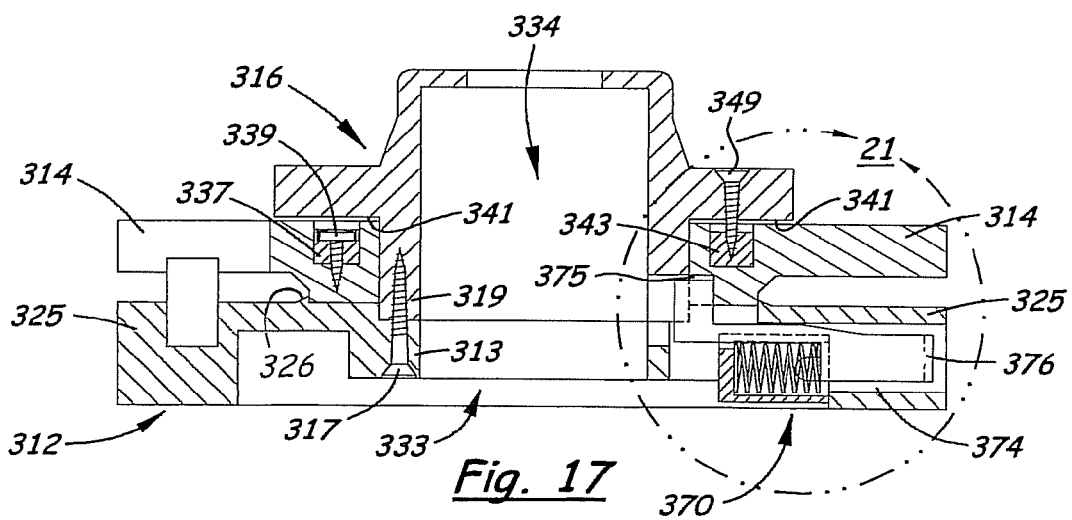
FIG. 17 is a schematic, cross-sectional view of the embodiment of FIG. 16, with cap installed, and the cross-sectional view being adapted so that the structure that controls each end of the springs is shown in addition to the lock system being shown.

As in the other embodiments discussed above, blades are rotatably received on the pins 324 of cutting head 300, and covered/retained by cover 314 by virtue of the tops of the pins 324 being received in channels 342 of the cover (FIG. 16). When the cover 314 is rotated approximately 25-45 degrees (and, more preferably, about 30 degrees, FIG. 18) the pins 324 are uncovered to allow removal of the blades.

Figure 18:
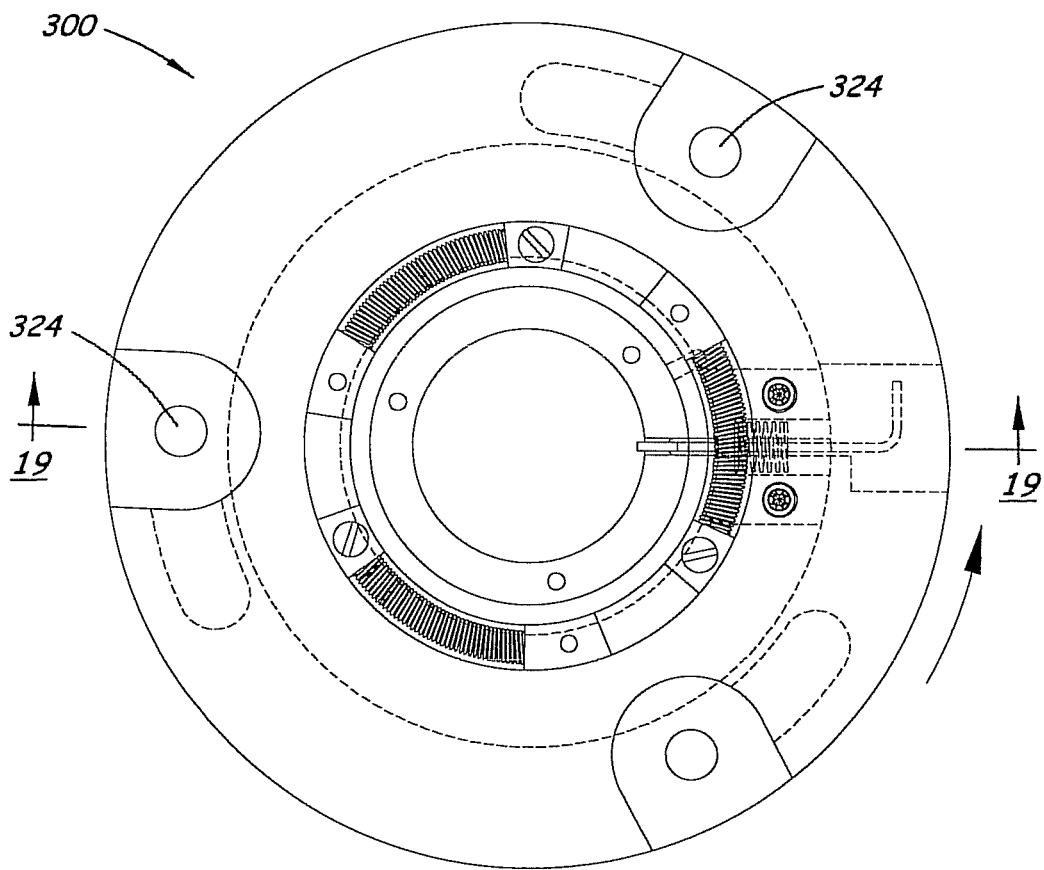
FIG. 18 is a top view of the embodiment of FIGS. 16 and 17, with cap removed, illustrating the lock unlocked, and the cover having been rotated counterclockwise and the annular springs compressed by said rotation of the cover.
Figure 19:
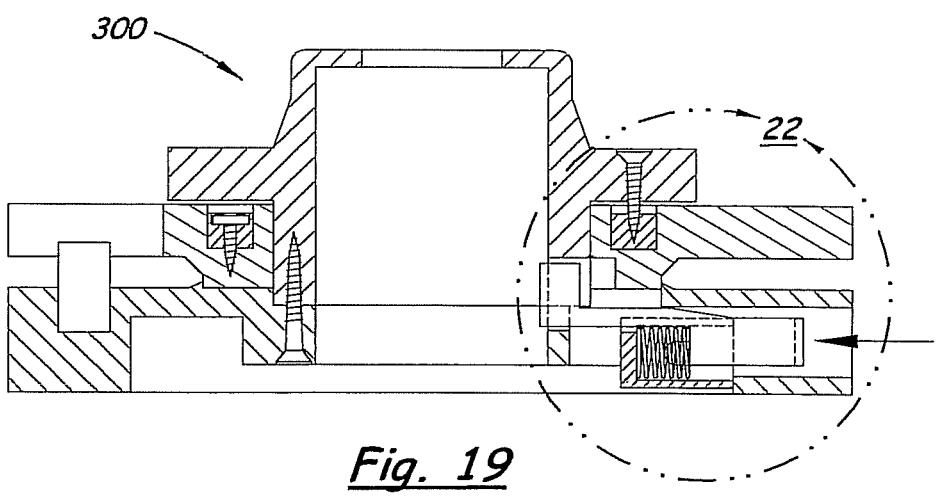
FIG. 19 is a cross-sectional view of the embodiment of FIG. 16-18, with the lock in the open position, again with the cross-sectional view being adapted so that the structure that controls each end of the springs is shown in addition to the lock system being shown.
Figure 20:
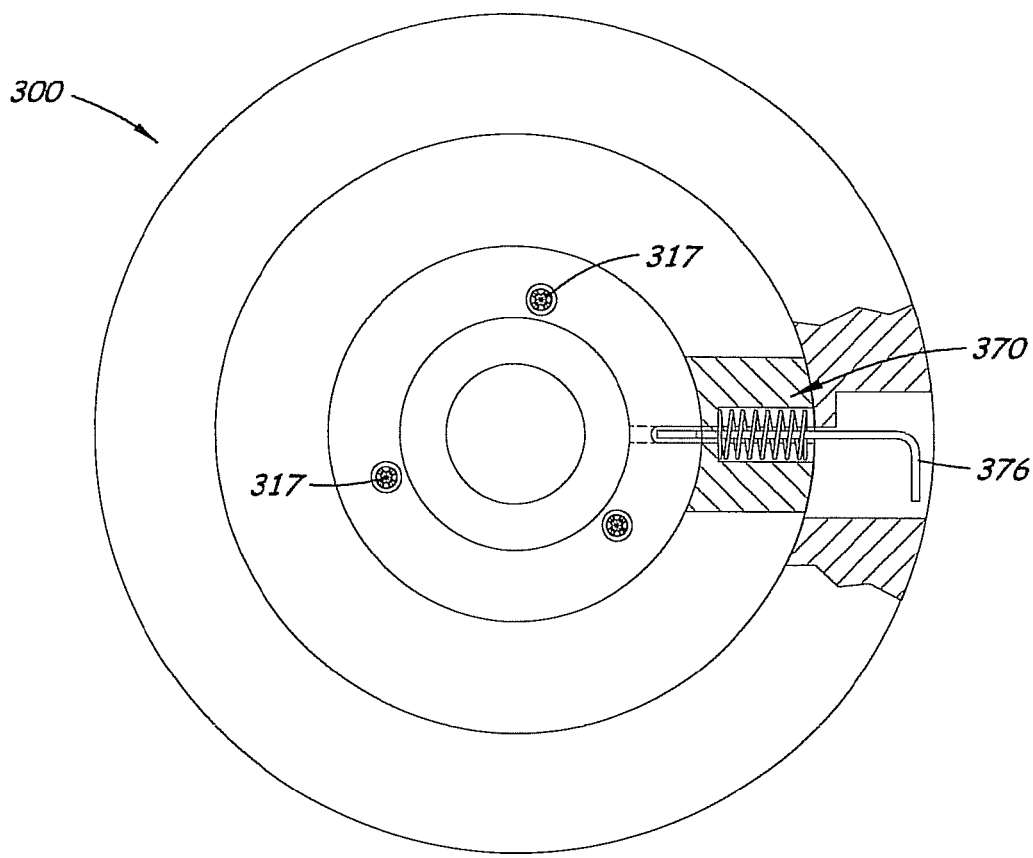
FIG. 20 is bottom view of the assembled cutting head of FIGS. 16-19, with the structure below the locked lock system cut away.
Figure 21:
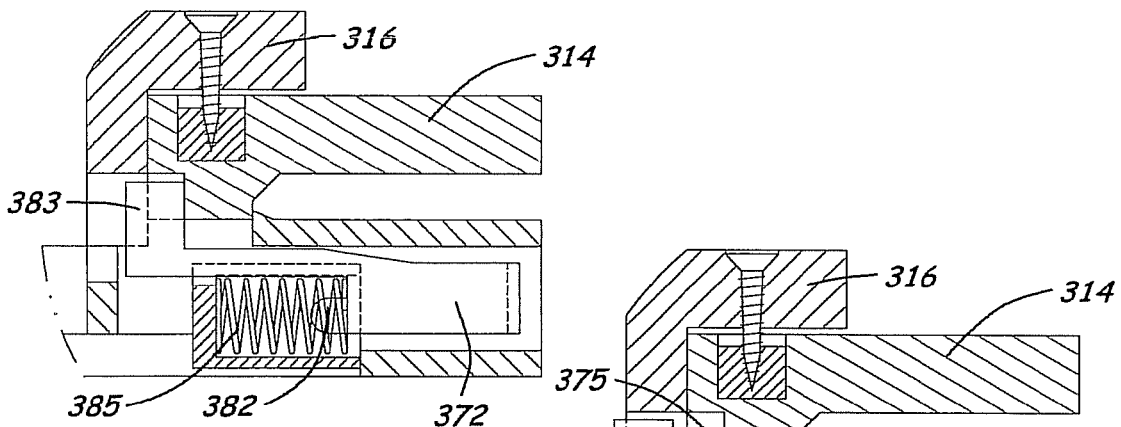
FIGS. 21 and 22 are detail, cross-sectional views of the embodiment of FIGS. 16-20, wherein the lock is locked (cover closed and locked) in FIG. 21 and the lock is unlocked (cover may be opened) in FIG. 22.
Figure 22:
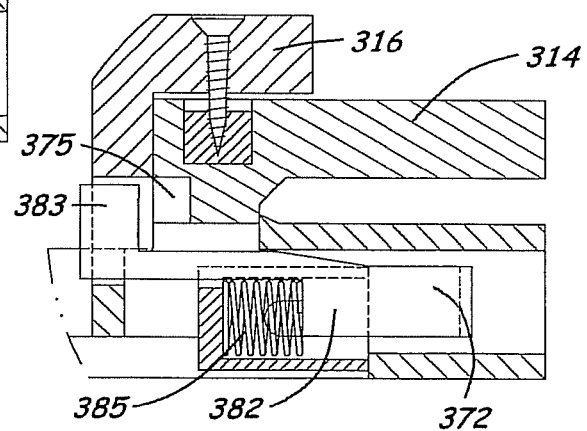

Referring specifically to FIGS. 16 and 18, head 300 is shown with cap 316 removed, by removing screws 317 and lifting cap 316 up off of the head 300. This allows the spring bias system for cover 314 to be more easily viewed. It should be noted, also, that the three cap-abutment-members 343, which are normally fixed to the underside (bottom surface 341) of cap 316 by screws 349, are shown in FIGS. 16 and 18 as being removed from the cap 316 and left resting in the annular grooves at the second ends 336" of the springs 336. The holes that are normally threadably engaged by screws 349 are left empty in these views. This way, members 343 may be viewed in their preferred position for use in compressing springs 336, as is further described below.

Cover 314 has in its upper surface one or more, and preferably three, annular grooves 335 that each receives a coil spring 336. At one end of each groove is a cover-abutment-member 337 against which is placed a first end 336' of each spring. As shown in FIGS. 16-19, the three cover-abutment-members 337 may be three inserted pieces fastened by screws 339 into a single circular groove at three locations approximately 120 degrees apart, to separate said single circular groove into three end-to-end grooves 335. Alternatively, the three cover-abutment-members may be closed ends of three separate channels molded or otherwise forming in the cover. In either structure, the first end 336' of each spring abuts against one of the cover-abutment-members 337.

A second end 336" of each spring abuts against a cap-abutment-member 343. The cap-abutment-members 343 are attached to, and extend downward from, the underside of the cap 316, for example, by means of screws 349 retaining the members 343 against the bottom surface 341. Cap-abutment-members 343 extend into, and slide in, each groove 335 at the second ends 336" of the springs 336. When cover 316 is rotated relative to the base 312 and cap 316, the cover and its cover-abutment-members 337 move counterclockwise (in FIG. 16) relative to the base 312 and the cap 316 and its cap-abutment-members 343, to compress the springs 336 between the cover-abutment-members 337 and the cap-abutment-members 343. Thus, due to the relative movement of cover and cap, the springs 336 are compressed between the members 337 and members 343 as shown in FIG. 18.

Springs 336 are retained from popping out of the grooves 335 by virtue of being captured between the groove surfaces (below and at two sides of the spring) and the bottom surface 341 of cap 316 (above the spring). The springs creates the bias that tends to keep the cover 314 closed over the pins 324.

Lock 370 is provided in cutting head 300 in a position that allows it to be accessed from the outer perimeter surface of the base 312, rather than from the top of the cutting head. This may allow the user to push the handle 376 with a finger of the hand holding the base 312, while the other hand rotates the cover 314. The details and operation of lock 370 are shown to best advantage in FIGS. 17 and 21 (locked) and FIGS. 19 and 22 (unlocked).

Lock 370 comprises a lock member such as lock plate 372 that resides in a vertically-orientated slot 374 that extends horizontally through the base 312 and upward into the cover 314 (slot portion 375). Lock plate 372 has two legs 382, 383, wherein leg 382 protrudes into a lock spring 385 and leg 383 protrudes up into slot portion 375 of cover 314. As one may see to best advantage in FIGS. 21 and 22, depressing the handle 376 of the lock member pushes lock plate 372 radially inward toward the center of the head 300, moving leg 383 radially out of slot portion 375 (FIG. 22), so that cover 314 can rotate relative to base 312 and cap 316. Upon releasing the lock handle 376, spring 385 biases the lock plate 372 radially outward again and leg 383 again crosses the boundary between, and resides in both, base 312 and cover 314, thus, locking the cover.

A user may change out cutting blades on the preferred embodiments of the invention, without tools and typically with one hand opening the cover and the other hand removing and replacing the blade(s). In embodiments wherein a lock is included, the user may need to use both hands to accomplish the task of depressing the lock, rotating the cover, and removing/replacing the blade(s), unless, for example, the lock is adapted to latch in an open position as well as a closed position. Upon release of the hand(s), especially in embodiments wherein the lock does not latch in the open position, the preferred cover will rotate/snap back into a position that covers the ends of the blades and the connection between the blades and the cutting head, and, in embodiments that have a lock, the lock will spring back into the locked position.

No tools need to be used for the blade-change-out process. If a person has problems with agility or with use of one of his hands, an item such as a cap or spacer may be inserted, upon opening of the cover, between one of the blades (not being replaced) and the spring-biased cover, to block the cover from rotating/snapping into closed position until the cap/spacer is removed. Also, the lock may be adapted to latch in the open position, so that the user does not need to manually hold the cover open; in such embodiments, further movement/manipulation of the lock may be necessary after replacing one or more blades, to close the cover, for example, by pressing the lock handle again without holding the cover, to let the spring(s) urge the cover to the closed position. In these ways, for example, the user would not have to hold the cover open while replacing the blade(s).

The rotation of the cover and base relative to one another preferably comprises rotating an upper portion relative to a temporarily-stationary lower portion, as described above and in the figures. In other embodiments, structure that allows rotating the lower portion relative to a temporarily-stationary upper portion may be used, or, in other embodiments for example, structure that allows rotating both upper and lower portions at the same time. In each case, there are various constructions other than that shown in the drawings that might allow these types of rotation, but the preferred embodiment, wherein the upper portion rotated relative to the lower portion offers simple design, simple and safe operation, and low chance of any pieces or parts falling out and becoming lost or becoming a hazard. Having the upper portion rotate to reveal the blades is preferable because the blades remain supported on the lower portion, preferably on pins in the lower portion, even when the upper portion has been rotated, thus, allow the user to reach and lift the blades without significant chance of the blades falling to the ground. Again, it should be noted that the terms "upper" and "lower" indicate relative positions of preferred portions of the device, but these terms do not necessarily preclude additional structure from being above and below, respectively, these upper and lower portions; for example, caps 16, 216, 316 are structure that is provided above/on-top-of the upper portions/covers 14, 214, 314.

Figure 23:
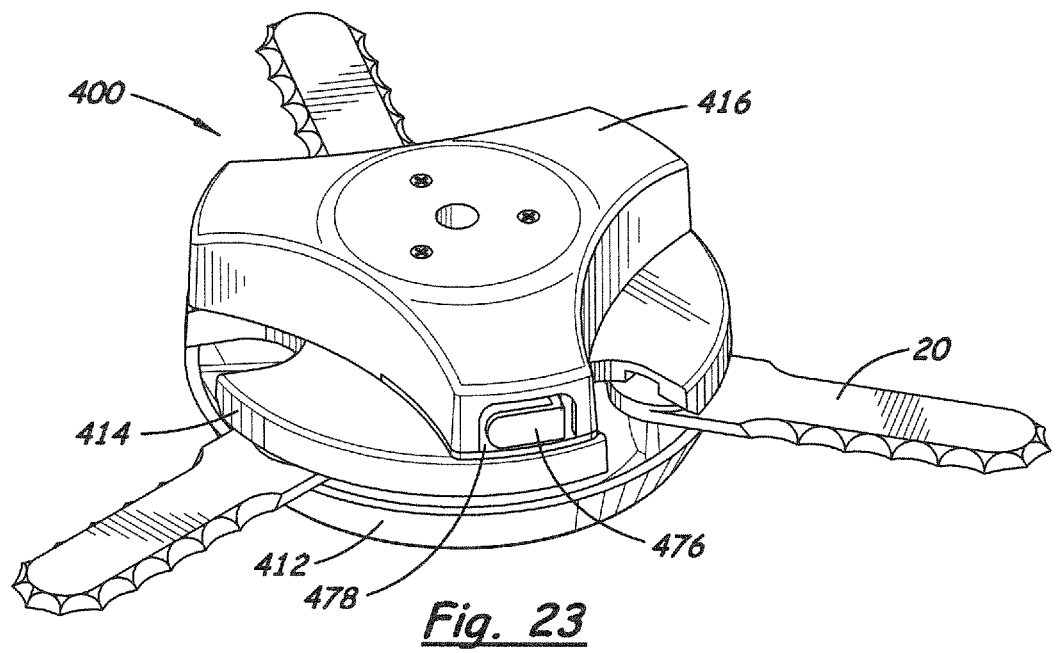
FIG. 23 is a top perspective view of an alternative embodiment of cutting head, with the handle of the lock member showing at an outer surface of the cutting head.

FIGS. 23-31 illustrate an alternative embodiment 400 that includes alternative shapes for the main portions (base, cover, and cap), alternative locations of bias springs, and an alternative lock system. The main portions are base 412, cover 414, and cap 416. Blades 20 are provided over the pins 424, as in previous embodiments and understood by viewing blades 20, pins 24, and notches 40 in FIGS. 2-10, and are removable upon rotation of the cover 414 relative to the base 412 and cap 416 (which are fixed together to be unmovable relative to each other during use) to align notches 440 with, and expose, the pinned ends of cutting blades 20. In FIG. 23, one may see to best advantage the handle 476 of the lock system 470 that a user may depress to unlatch the cover from the base 412.

Figure 24:
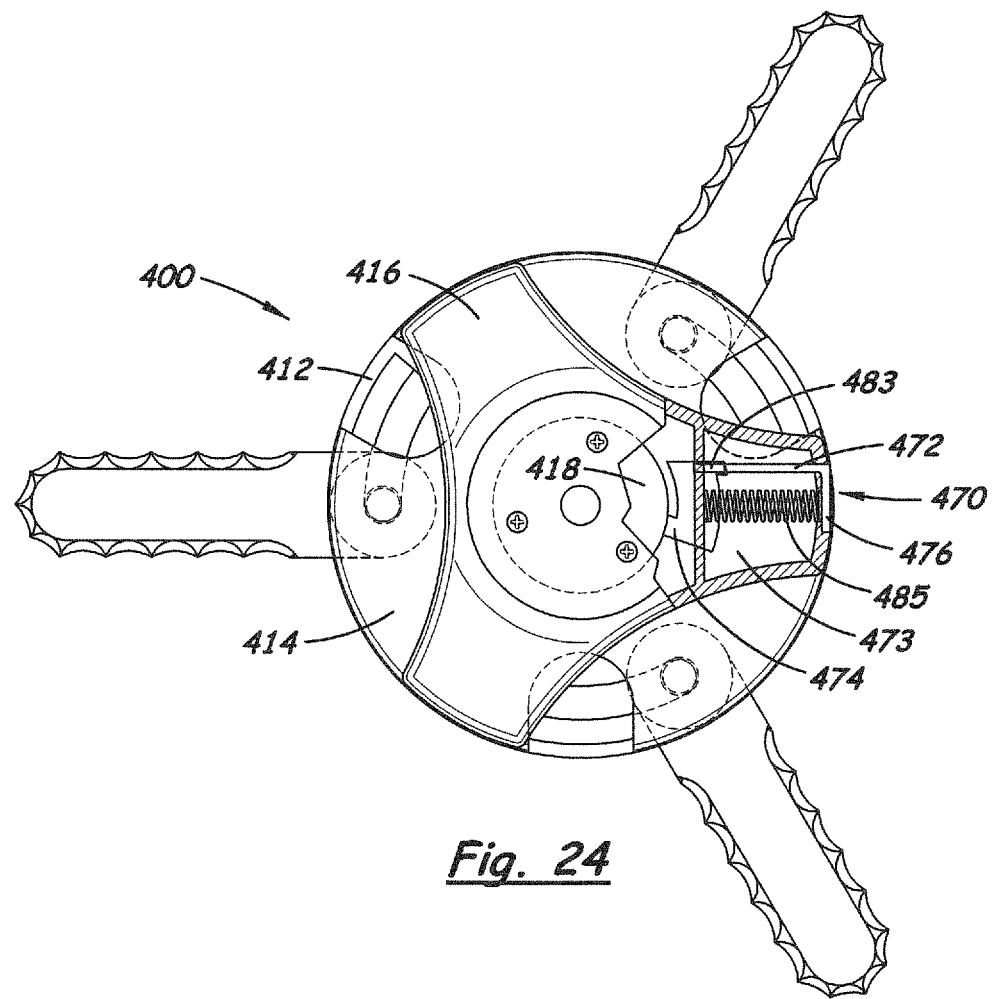
FIG. 24 is a top view of the cutting head of FIG. 23, with the cover in the locked, closed position, and with a portion of the cutting head cut-away to show details and position of an embodiment of the lock system.

FIG. 24 shows the device 400 with the cover 414 closed, wherein the cover retains the blades 20 from being lifted up off the pins 424, in a similar manner as described earlier. The lock system 470 relies on a lock member with handle, plate and leg, at least one spring (that may be called a "lock-spring"), and a slot into/through portions of the cutting head, wherein the slot may be said to comprise a cap slot portion 473 and a cover slot portion 474. See FIGS. 24, 25, 27, 30 and 31. The lock member resides mainly in the cap slot portion 473 in the cap 416, but a portion of the lock system extends down in a cover slot portion/space 474 that is a recess in the top surface of the cover 414. The lock system 470 includes a lock member 471 (see FIG. 31) which comprises a lock plate 472 with a handle 476 and a leg 483. The handle 476 is generally parallel to, and accessible through an aperture 478 in, the outer circumferential rim surface of the cap 416. See FIGS. 23 and 26. The lock plate 472 extends horizontally (radially inward, transverse to the rotational axis) and is fixed or integrally-formed with the handle. The lock plate extends toward, but not to, the central axis (the rotational axis) of the cap; thus, the plate 472 extends radially inward from the handle to a position between the outer perimeter edge of the cap and the central axis of the cutting head.

The leg 483 is fixed or integrally-formed with the lock plate 472 and protrudes downward from the lock plate 472 (parallel to the rotational axis) to reside in the slot portion 474 of the cover. When the lock system 470 is latched to keep the cover in the closed position, the lock member 471 (handle/plate/leg combination) is biased outward by spring 485 so that leg 483 extends into a first notch 475 (or "lock-notch") of the slot portion 474. This first notch 475 is a radially-outward-extending portion of the outer edge surface 477 of slot portion 474. Also, one may say that the slot portion is a circumferential space that is circumferentially adjacent and mechanically communicating/connected with the first notch 475. With the leg 483 of the cap 416 lodged in the first notch 475 of the cover 414, the cover cannot rotate any significant amount relative to the cap 416. This way, the cover is locked over the pins to keep the blades 20 on their pins 424.

When the handle 476 is depressed into the cap 416, the lock plate 472 moves its leg 483 radially inward toward the rotational axis of the cutting head and out of the first notch 475. Thus, the leg is in the main portion of the slot portion 474, which main portion extends circumferentially a distance that is approximately equal to the amount the cover must rotate to properly uncover the blades. Thus, the cover may rotate relative to the cap (and particularly relative to the leg 483) enough to uncover the blades on their pins, which is typically 25-45 degrees, and more preferably about 30 degrees. In FIG. 24, the cover is closed, the leg 483 is in the first notch, and the blades are captures/retained.

Figure 25:
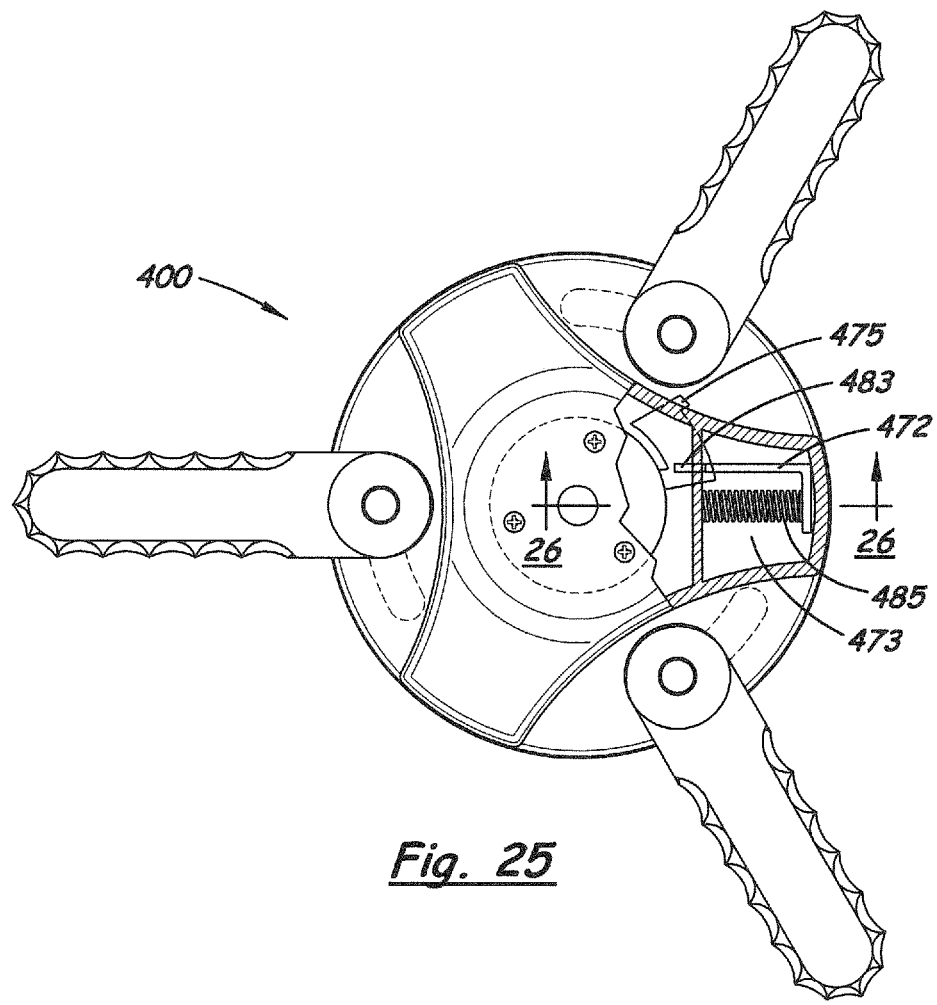
FIG. 25 is a top view of the cutting head of FIGS. 23 and 24, with the cover in the unlocked, open position, and with a portion of the cutting head cut-away to show details and position of the lock system.
Figure 26:
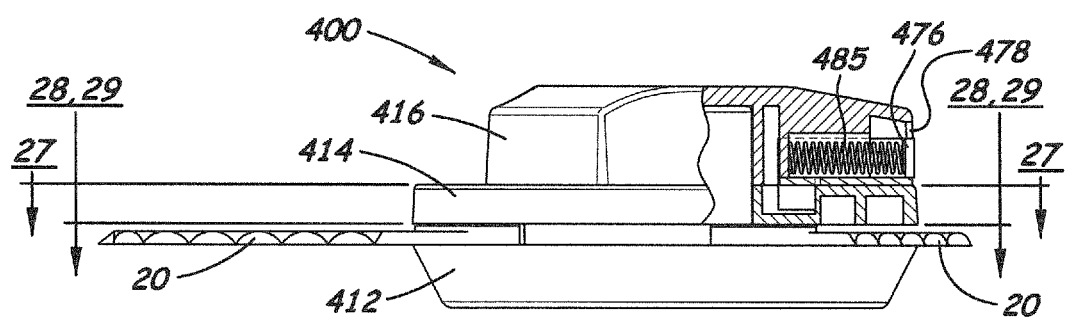
FIG. 26 is a side, partial-cross-sectional view of the cutting head of FIGS. 23-25, viewed along the line 26-26 in FIG. 25.
Figure 27:
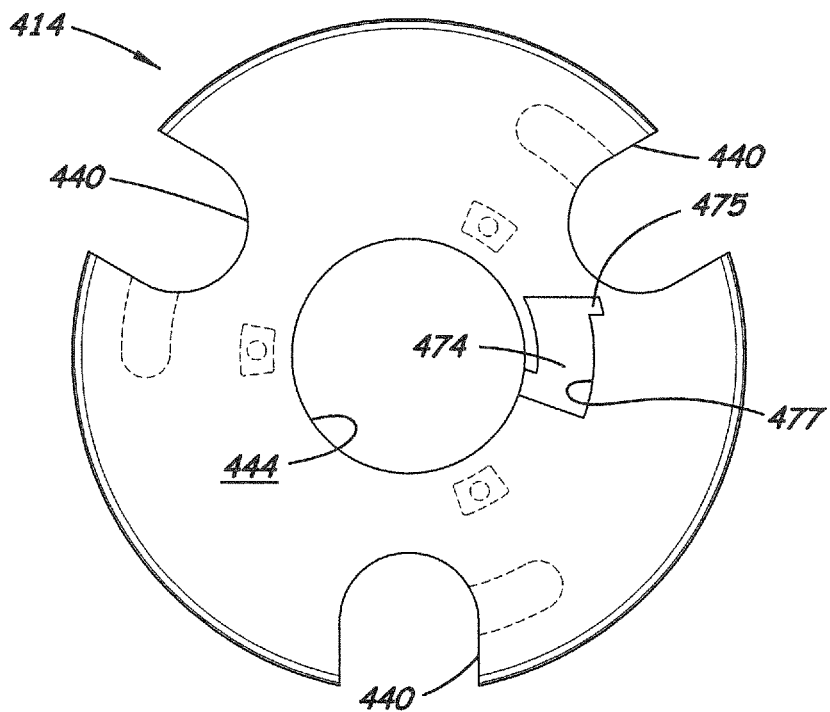
FIG. 27 is a top view of the cover of the cutting head of FIGS. 23-26.

In FIG. 25, the handle 476 is depressed, the plate has moved the leg 483 out of the first notch 475 so that the cover may be moved by the user relative to the leg 483. One may see the leg 483 at generally the opposite end of the slot portion 474 compared to its location in the first notch in FIG. 24. In FIG. 25, one may see that, due to the bias of springs 436, the user must grasp the cover to hold it in the open position relative to the base and/or cap, to prevent it from snapping shut. The user may typically release the handle while the cover is being held in the open position, as the spring 485 will simply pull the leg 483 to slide along against the outer edge surface 477 during this opening-phase of the cover. If the user then releases the cover from his/her hand, the springs 436 will typically rotate/snap the cover closed, and, while this is happening, the cover rotates relative to the leg 483 so that the leg then returns (by sliding along surface 477) to the end of the slot portion 474 where the notch 475 resides. The leg may snap/slide into the notch 475 to again lock the cover from rotating relative to the base/cap combination.

Figure 28:
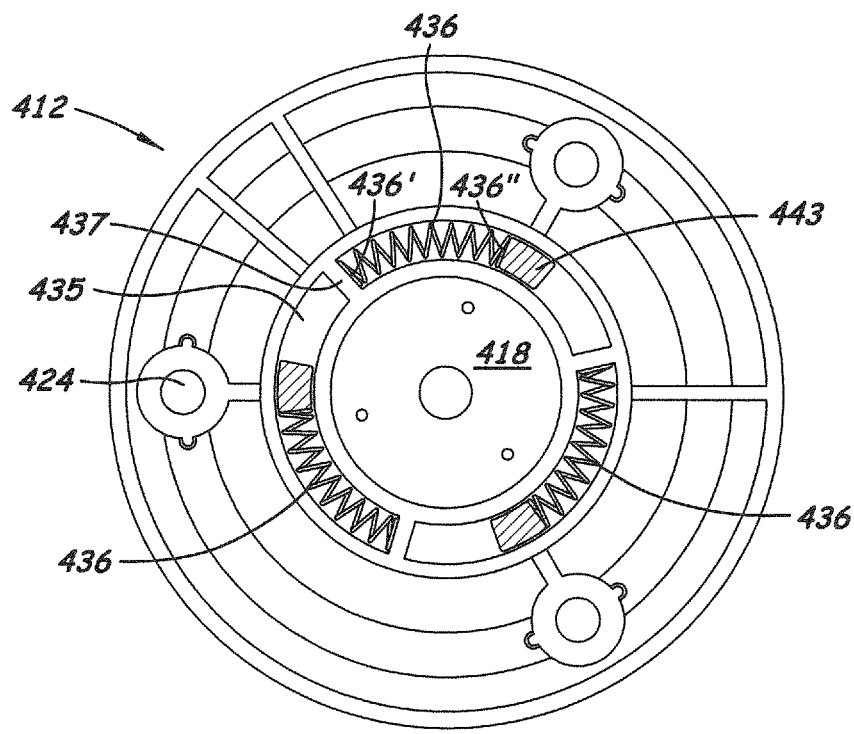
FIG. 28 is a top view of the base of the cutting head of FIGS. 23-26, with protrusions, depending from the cover to interact with the coil springs, shown in cross-section, wherein the springs and protrusions are in positions corresponding to the cover being biased into the open position.
Figure 29:
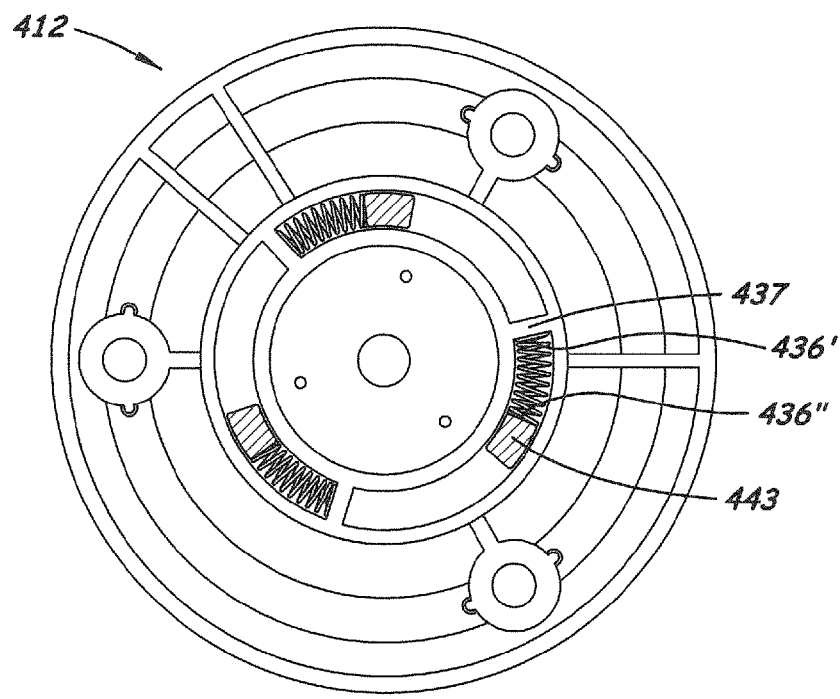
FIG. 29 is a top view of the base of the cutting head of FIGS. 23-26, with protrusions, depending from the cover to interact with the coil springs, shown in cross-section, wherein the springs (being compressed) and protrusions are in positions corresponding to the cover being manually moved into the open position.
Figure 30:
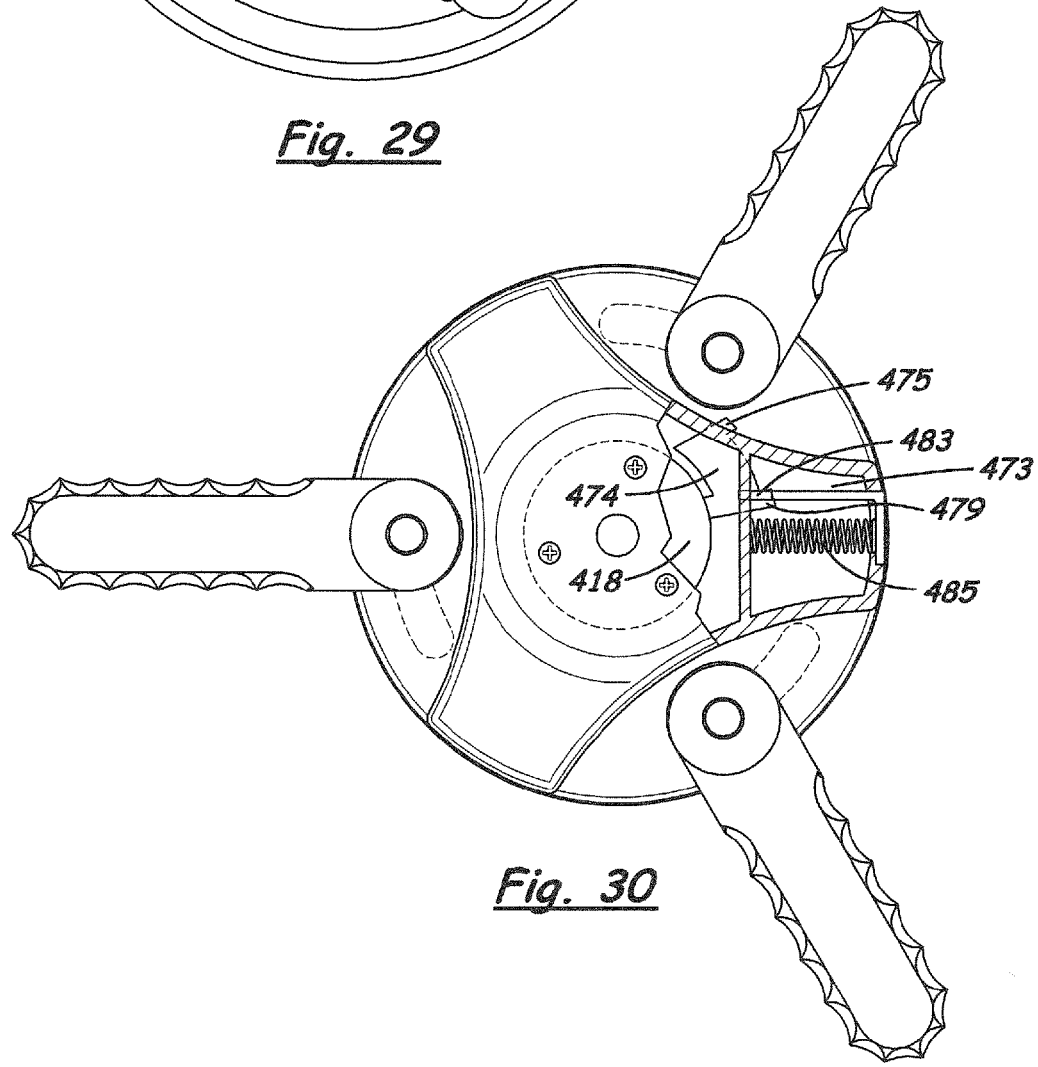
FIG. 30 is a top view of the cutting head of FIGS. 23-26, with an alternative slot portion in the cover, wherein a second notch receives the leg of the lock member to retain the cover in the open position; a portion of the cutting head is cut-away to show details and position of the lock system.

Referring specifically to FIGS. 28 and 29, the spring bias system that urges cover 414 to a closed position may be more easily viewed. It should be noted that, in this embodiment, the bias springs for closing the cover 414 are received in annular grooves 435 of an upper surface of the base 412.

Base 412 has, in upper surfaces, one or more, and preferably three, annular grooves 435 or recesses, which each receives a coil spring 436. At one end of each groove is a base-abutment-member 437 against which is placed a first end 436' of each spring. The three base-abutment-members 437 may be three inserted pieces fastened by screws into a single circular groove at three locations approximately 120 degrees apart, to separate said single circular groove into three end-to-end grooves 435. Alternatively, and more preferably, the three base-abutment-members 437 may be closed ends of three separate channels molded or otherwise forming in the base.

A second end 436" of each spring abuts against a cover-abutment-member 443. The cover-abutment-members 443 are attached to, and extend downward from, the underside of the cover 414, for example, by means of screws retaining the members 443 against the bottom surface of the cap, or, more preferably, by means of the cover-abutment-members 443 being integrally-molded portions of the cover bottom surface. Cover-abutment-members 443 extend into, and slide in, each groove 435 of the base, at the second ends 436" of the springs 436. When cover 414 is rotated relative to the base 412 and cap 416, the cover-abutment-members 434 move counterclockwise (in FIG. 29) relative to the base 412 and its base-abutment members 437, to compress the springs 336. Thus, the springs 436 are compressed between the base-abutment-members 437 and cover-abutment-members 443, as shown in FIG. 29.

Springs 436 are retained from popping out of the grooves 335 by virtue of being captured between surfaces of the grooves 435 surfaces (below and at two sides of the spring) and a bottom surface or molded protrusions of cover 414 (above the spring). The springs creates the bias that tends to keep the cover 414 closed over the pins 424.

Figure 31:
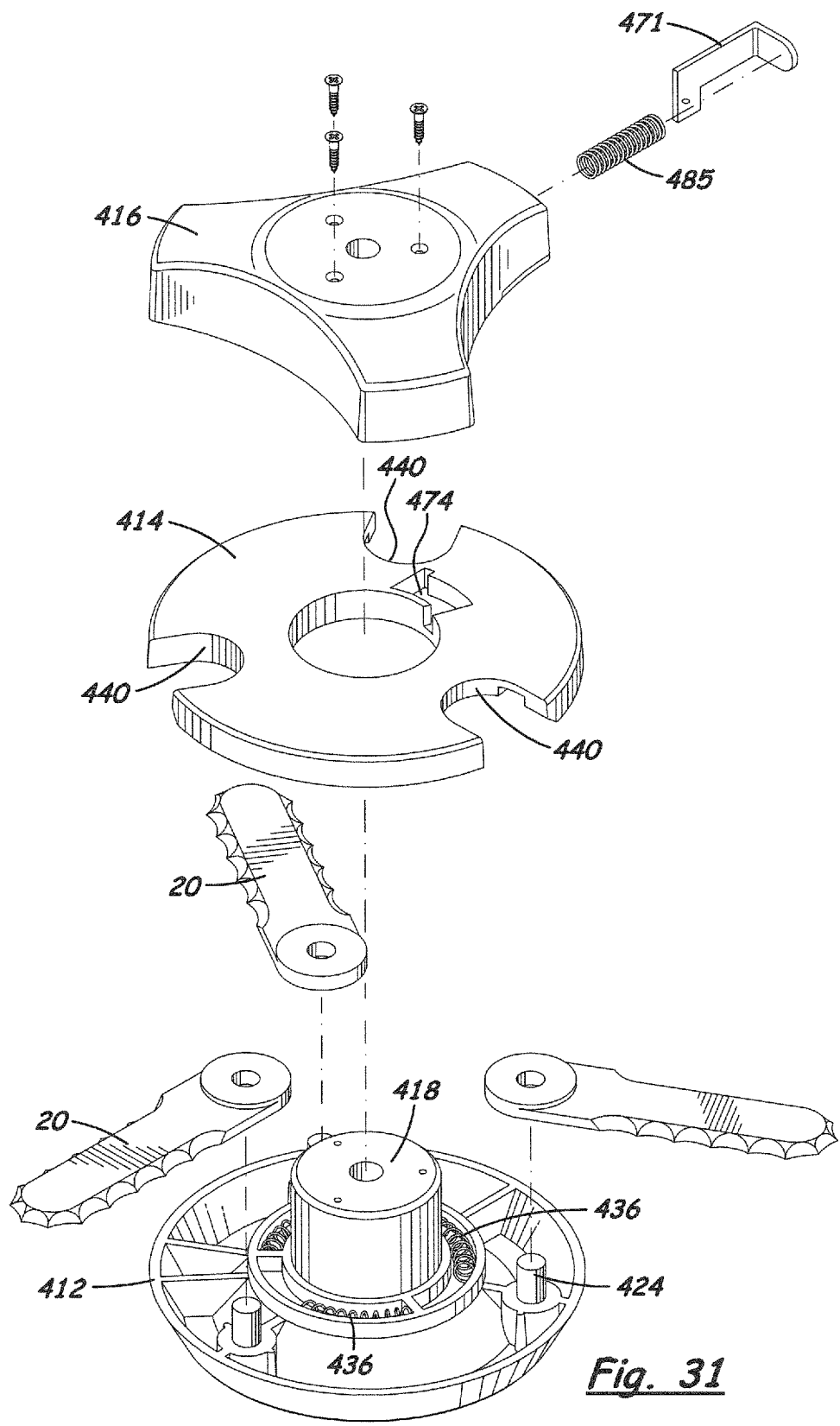
FIG. 31 is an exploded, perspective view of the cutting head of FIGS. 23-26 and the pieces parts of FIGS. 27-29.

FIG. 31 is an exploded view of the cutting head 400. This figure shows the shapes of the pieces-parts of the head 400, from which will be understood the relationships of the pieces-parts and how they fit together. For example, one may see the spool 418 that protrudes upward from the base 412, extends through a central bore of the cover 414 (defined by surface 444) centered at the rotational axis of the head 400. the spool 418 connects to the cap 416 by means of screws through the cap top surface and into the spool 418. The cover rotates on this spool 418, with the spool acting as a large axle for the cover.

It may be understood from this disclosure that the biasing of the cover into a closed position may be accomplished by bias member(s) engaging the cover and another portion of the device, which may be, for example, the base and/or the cap. FIGS. 1-15, and FIGS. 23-31 illustrate devices wherein bias member(s) engaging the base and the cover serve(s) to urge the cover closed, and FIGS. 16-22 illustrate devices wherein bias member(s) engaging the cover and the cap serve(s) to urge the cover closed.

The Figures illustrate some, but not all of, lock systems that may be used in embodiments of the invention. FIGS. 12-15 illustrate an embodiment, wherein the locking system is accessed by the user at or near the top of the device, for example, at the top of the cap. In the FIG. 12-15 embodiment, the locking system has a portion(s) extending down from the cap to latch into the cover, while also extending into the base. FIGS. 16-22 illustrate an embodiment wherein the locking system is assessed at the outer perimeter edge of the base, wherein the locking system has a portion(s) extending upward into the cover to latch the cover to the base. See also FIG. 34 for a schematic representation of such a lock system. FIGS. 23-31 illustrate embodiments wherein the locking system is accessed by the user at the perimeter of the cap, and wherein the locking system has a portion(s) extending down to latch into the cover.

Figure 32:
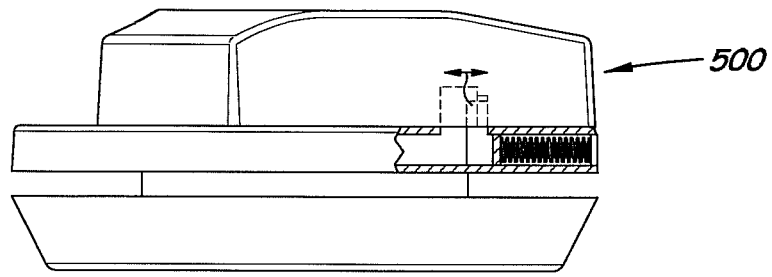
FIG. 32 is a schematic side view of an alternative embodiment of lock system, with the lock slot extending from an outer surface of the cover through a slot portion in the cover and into a slot portion in the cap.

FIG. 32 illustrates schematically a cutting head 500 with a lock system that extends generally horizontally into the cover, wherein the lock handle is at or near the outer perimeter of the cover. The lock system extends parallel to the central plane of the cover (horizontal plane extending through the middle of the plane), with a leg/tab extending up into the cap to latch into, and unlatch by moving out of, a locking notch/slot of the cap. The leg/tab and the entire lock system are adapted so that they prevent cover rotation when the leg/tab is inside the locking notch/slot, but so that they do not interfere with rotation of the cover relative to the base and cap when the leg/tab is outside of the locking notch/slot. The lock resides is a region outward from the central axis of the device and of the cover and cap, and locks the cover to the cap in a closed position.

Figure 33:
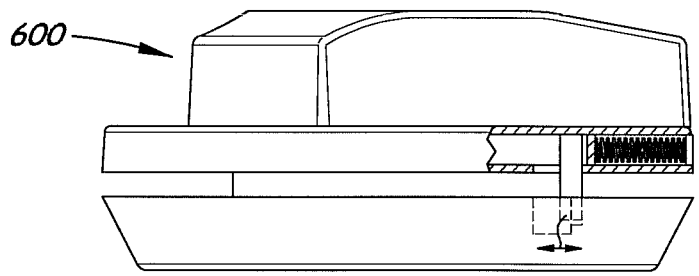
FIG. 33 is a schematic side view of an alternative embodiment of lock system, with the lock slot extending from an outer surface of the cover through a slot portion in the cover and down into a slot portion in the base.

FIG. 33 illustrates schematically a cutting head 600 with a lock system that also extends into the cover, as in FIG. 32, but that has a leg/tab extending downward into the base to latch into, and unlatch by moving out of, a locking notch/slot of the base. The leg/tab and the entire lock system are adapted so that they prevent cover rotation when the leg/tab is inside of the locking notch/slot, and so that they do not interfere with rotation of the cover relative to the base and cap when the leg/tab is outside of the locking notch/slot. Again, the lock of FIG. 33 resides is a region outward from the central axis of the device and of the cover and base and locks the cover to the base in a closed position.

Figure 34:
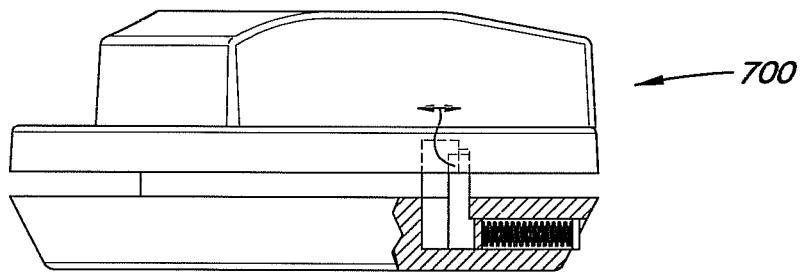
FIG. 34 is a schematic side view of an embodiment of lock system, wherein the lock slot extends from an outer surface of the base through a slot portion in the base and into a slot portion in the cover.

FIG. 34 illustrates schematically a cutting head 700 with a lock system that extends generally horizontally into the base, wherein the lock handle is at or near the outer perimeter of the base, and the lock extends parallel to the central plane of the base. The lock system has a leg/tab extending upward into the cover to latch into, and unlatch by moving out of, a locking notch/slot of the cover. The leg/tab and the entire lock system are adapted so that they prevent cover rotation when the leg/tab is inside of the locking notch/slot, and so that they do not interfere with rotation of the cover relative to the base and cap when the leg/tab is outside of the locking notch/slot. The lock resides is a region outward from the central axis of the device and of the cover and cap, and locks the cover to the base in a closed position. See also the embodiment of FIGS. 16-22.

Figure 35:
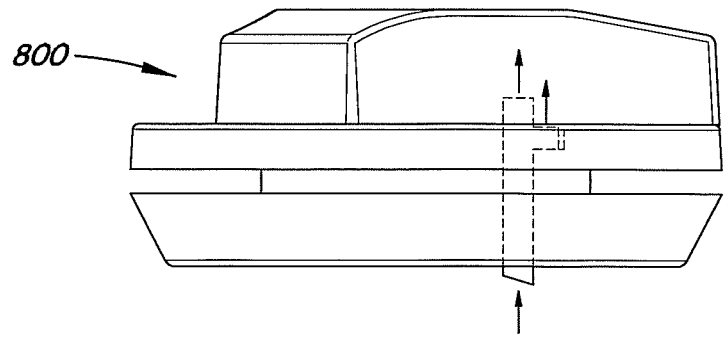
FIG. 35 is a schematic side view of an alternative embodiment of lock system, with the lock slot extending from an outer surface of the base through a slot portion of the base and into a slot portion in the cover and also a slot portion in the cap; in this embodiment, the outer surface at or near which the handle resides is a bottom surface of the base.

FIG. 35 illustrates schematically a cutting head 800 with a lock system that extends generally vertically through the base and into the cover, wherein the lock handle is at or near the bottom surface of the base. The lock extends perpendicular to the central plane of the base, and has a leg/tab extending horizontally out from an arm/plate of the lock to latch into, and unlatch by moving out of, a notch/slot of the cover, by vertical movement down into the notch/slot and by vertical movement up out of the notch/slot. The leg/tab and the entire lock system are adapted so that they prevent cover rotation when the leg/tab is lowered into of the locking notch/slot, and so that they do not interfere with rotation of the cover relative to the base and cap when the leg/tab is raised up out of the locking notch/slot. In this embodiment, it will be understood that, when the lock is pressed to disengage the cover, that a middle portion of the lock member, which is just below the leg/tab, will reside in a slot/space in the cover wherein it will allow the cover to rotate relative to the base, the cap, and the lock member. The lock resides is a region outward from the central axis of the device and of the cover and cap, and locks the cover to the cap in a closed position.

As may be understood from this disclosure, the locking member (preferably, combined handle, plate(s), and leg/tab) of the preferred locking system are rigid or substantially rigid, so that pressure on the handle will be transmitted to the leg/tab that moves in and out of the locking notch/slot. A coil spring is shown in each of FIGS. 32-35 as the preferred bias member for the locking system, but one may use other biasing member(s), with adaptation of the lock members to receive and cooperate with the biasing member(s), as will be understood by one of skill in the art.

Also, it will be understood from viewing the figures and this disclosure that other styles, shapes, and numbers of biasing members may be used for urging the cover to a closed position. For example, one example of a torsion spring engaging the base and the cover has been shown, but a torsion spring may be used to engage the cover and the cap. Also, more than one torsion spring may be used between the cover and the base and/or the cap.

While several embodiments have been described and drawn, it should be noted that other embodiments may have bodies that are shaped, and that cooperate, differently. The preferred structures and functions are a base that supports the blades, a cover that retains the blades on the base, and apparatus for rotatably joining the cover to the base and for joining the base plus cover assembly to the cutting machine. Typically, the cover is rotatably received between the base and a cap, wherein both base and cap are fixed to each other and fixed to the machine, but other arrangements may be used.

Although this invention has been described above and drawn with reference to particular means, materials, and embodiments, it is to be understood that the invention is not limited to these disclosed particulars, but extends instead to all equivalents within the broad scope of the following claims.

The invention claimed is:

1. A cutting head for attachment to a rotary vegetation cutting machine, the cutting head comprising:
   a base for being fixed to a rotary vegetation cutting machine and having at least one pin extending upward from the base;
   a blade slidably received on said at least one pin;
   a cover rotatable mounted on said base and having at least one notch in an outer perimeter of the cover, wherein the cover is rotatable in a plane parallel to the base from a closed position wherein the blade on its respective pin is blocked by the cover from being lifted up off of the pin for removal from the cutting head, to an open position wherein the notch is over said at least one pin and the blade is liftable from the pin and removable from the cutting head;
   a cap positioned over a portion of the cover and fixed to the base by a spool that connects the base to the cap;
   wherein the cover is biased to stay in the closed position unless manually rotated to an open position; and
   a lock system including a rigid lock plate that has a handle near an outer surface of the cap, the lock plate extending through a portion of the cap and having a leg that protrudes down into a space in the cover, wherein said space has a lock-notch;
   a spring that biases the leg into said lock-notch to lock the cover in said closed position to prevent the cover from rotating relative to the leg and relative to the cap, and, wherein, when the handle of the lock plate is depressed into the cap against the bias of the spring, said leg moves out of the lock-notch to allow said cover to rotate relative to the cap to said open position.

2. The cutting head as in claim 1 comprising three of said pins upending from the base and three blades received on said pins, and wherein the cover has three notches in the outer perimeter edge that, when the cover is in the open position, reside over said three pins to allow lifting and removal of said three blades.

3. The cutting head as in claim 1, wherein no screws and no bolts extend from the base to the cover.

4. The cutting head as in claim 3, wherein no screws and no bolts extend from the cap to the cover.

5. The cutting head as in claim 1, wherein the cover is biased to the closed position by a torsion spring having a lower arm embedded in the base and an upper arm embedded in the cover.

6. The cutting head as in claim 1, wherein the cover is biased to the closed position by at least one coil spring in the cover that is engaged by at least one downward protrusion from the cap.

7. The cutting head as in claim 1, wherein the cover is biased by the at least one coil spring provided in a curved groove in the cover and wherein said at least one coil spring is compressed when the cover rotates into the open position by a first abutment member and a second abutment member at opposite ends of the coil spring moving closer together, wherein said first abutment member is at one end of the groove to abut against one end of the coil spring, and the second abutment member extends from the cap into an opposite end of the groove to abut against an opposite end of the coil spring.

8. The cutting head as in claim 1, wherein the handle is at a top surface of the cap.

9. A cutting head for attachment to a rotary cutting machine for vegetation, the head comprising:
   a base adapted to be fixed to a rotating shaft of a rotary cutting machine, so that the cutting head rotates on a central axis, the base having a platform surface on a plane transverse to the rotating shaft, and the base having multiple pins upending from the platform surface in a direction perpendicular to the platform surface;
   blades being installed on each of said pins by each blade having a hole slidably receiving one of said pins;
   a cover provided, in a closed position, over the pins, and rotatable to an open position not covering said pins, so that said blades are removable without tools when the cover is in the open position;
   a cap positioned over the cover and fixed to the base, wherein the cover is rotatable between base and the cap, to the open position and to the closed position;

a lock system comprising a handle near an outer surface of the cutting head, and a lock plate selected from the group consisting of: a lock plate extending through a portion of the cap and into a space in the cover to lock the cover relative to the cap by a leg of the lock plate being biased into a lock-notch of said space; and a lock plate extending through a portion of the base and into a space in the cover to lock the cover relative to the base by a leg of the lock plate being biased into a lock-notch of said space;

a spring in said cutting head that biases said leg into said lock-notch to lock the cover in said closed position to prevent the cover from rotating relative to the leg and relative to the cap, and, wherein, when the handle of the lock plate is depressed into the cutting head against the bias of the spring, said leg moves out of the lock-notch to allow said cover to rotate relative to the cap to said open position.

10. The cutting head of claim 9, wherein the handle is at a top surface of the cap.

11. The cutting head of claim 9, wherein the handle is at an outer perimeter edge of the base.

12. The cutting head of claim 9, further comprising a coil spring in an annular groove inside the cover that biases the cover to close.

13. The cutting head of claim 12, further comprising three of said coil springs that bias the cover to close.

14. A cutting head for attachment to a rotary vegetation cutting machine, the cutting head having a rotational axis and comprising:

a base having a plurality of pins extending upward from the base;

a plurality of blades slidably received on said pins;

a cover on said base and having notches in an outer perimeter of the cover, wherein the cover is rotatable in a plane parallel to the base from a closed position wherein the blades on the pins are blocked by the cover from being lifted up off of the pins for removal from the cutting head, to an open position wherein the notches are over said pins and the blades are liftable from the pins and through said notches to be removable from the cutting head;

a cap positioned over a portion of the cover and fixed to the base by a spool at said rotational axis that connects the base to the cap;

wherein the cover is biased by at least one spring to stay in the closed position unless manually rotated to an open position; and a lock system comprising a slot, a lock member with a handle, and a lock-spring, the slot extending from an outer surface of the cap through a portion of the cap and down through a portion of the cover so that the slot comprises a cap slot portion and a cover slot portion;

the handle being accessible through an aperture at said outer surface of the cap, and the lock member extending from said outer surface of the cap through the cap slot portion and into the cover slot portion;

wherein, when the cover is in the closed position, the lock member is biased by the lock-spring to reside in both the cap slot portion and a lock-notch of the cover slot portion to lock the cover by blocking rotation of the cover relative to the cap; and wherein, when the handle of the lock system is depressed against the bias of the lock-spring into said slot, the lock member moves out of the cover slot lock-notch so that the lock member does not block rotation of the cover relative to the cap so that the cover is manually moveable to said open position for removal of the blades.

15. The cutting head as in claim 14 comprising three of said pins upending from the base and three blades received on said pins, and wherein the cover has three notches in the outer perimeter edge of the cover that, when the cover is in the open position, reside over said three pins to allow lifting and removal of said three blades.

16. The cutting head as in claim 14, wherein no screws and no bolts extend from the base to the cover.

17. The cutting head as in claim 14, wherein no screws and no bolts extend from the cap to the cover.

* * * * *